United States Patent
Fitzpatrick et al.

(10) Patent No.: US 8,209,219 B2
(45) Date of Patent: Jun. 26, 2012

(54) VISION-BASED MEASUREMENT OF BULK AND DISCRETE FOOD PRODUCTS

(75) Inventors: Kerien W. Fitzpatrick, Pittsburgh, PA (US); R. Craig Coulter, Apollo, PA (US); Ralph Gross, Pittsburgh, PA (US)

(73) Assignee: HyperActive Technologies, Inc., Pittsburgh, PA (US)

(*) Notice: Subject to any disclaimer, the term of this patent is extended or adjusted under 35 U.S.C. 154(b) by 1729 days.

(21) Appl. No.: 11/402,552

(22) Filed: Apr. 12, 2006

(65) Prior Publication Data

US 2006/0218057 A1 Sep. 28, 2006

Related U.S. Application Data

(63) Continuation-in-part of application No. 11/032,547, filed on Jan. 10, 2005, and a continuation-in-part of application No. 10/823,027, filed on Apr. 13, 2004, now abandoned.

(51) Int. Cl.
*G06F 17/30* (2006.01)
*G07G 1/00* (2006.01)
*G06Q 30/00* (2012.01)
*G06Q 50/00* (2012.01)
*G06Q 20/00* (2012.01)
*G06G 1/14* (2006.01)

(52) U.S. Cl. ............... 705/10; 705/15; 705/22
(58) Field of Classification Search .......... 705/10, 705/15, 22
See application file for complete search history.

(56) References Cited

U.S. PATENT DOCUMENTS

| | | | |
|---|---|---|---|
| 4,392,119 A | 7/1983 | Price et al. | |
| 4,530,067 A | 7/1985 | Dorr | |
| 4,935,720 A | 6/1990 | Kalfoun | |
| 5,053,868 A * | 10/1991 | Higgins et al. | 348/150 |
| 5,132,914 A | 7/1992 | Cahlander et al. | |
| 5,172,328 A | 12/1992 | Cahlander et al. | |
| 5,602,730 A | 2/1997 | Coleman et al. | |
| 6,026,372 A | 2/2000 | Savage | |
| 6,842,719 B1 * | 1/2005 | Fitzpatrick et al. | 702/182 |
| 6,930,296 B2 * | 8/2005 | Chen | 219/700 |
| 6,937,922 B2 * | 8/2005 | Shimizu | 700/230 |

(Continued)

OTHER PUBLICATIONS

An algorithm for locating mushrooms in a growing bed: Tilbert R; Computers and Electronics in Agreiculture 6. 3: 191-200 (Dec. 1991).*

(Continued)

*Primary Examiner* — Matthew Gart
*Assistant Examiner* — Harshad Parikh
(74) *Attorney, Agent, or Firm* — The Webb Law Firm

(57) ABSTRACT

In a real time food production management system and method, real time data about consumers inside or in the vicinity of a food outlet and an amount of prepared food available to serve and/or an amount of food being prepared is electronically generated. Based on the real time data, a demand for an amount of food to be ordered by the consumers in a specified interval immediately succeeding the generation of the real time data is electronically predicted. In addition, at least one of the following is electronically determined based on the real time data: a predicted amount of additional food requiring preparation; the time at least one prepared food product has been available; a length of time that a cooked food component has been cooked; and an amount of a food component, a condiment and/or a topping resides in a food product assembly buffer.

19 Claims, 12 Drawing Sheets

U.S. PATENT DOCUMENTS

| | | | |
|---|---|---|---|
| 6,967,716 B1 * | 11/2005 | Cochran et al. | 356/239.4 |
| 7,110,964 B2 * | 9/2006 | Tengler et al. | 705/21 |
| 7,292,723 B2 * | 11/2007 | Tedesco et al. | 382/159 |
| 7,422,153 B2 * | 9/2008 | Cai | 235/462.01 |
| 7,973,642 B2 * | 7/2011 | Schackmuth et al. | 340/5.92 |
| 8,037,969 B2 * | 10/2011 | Curt et al. | 186/41 |
| 2002/0047867 A1 * | 4/2002 | Mault et al. | 345/810 |
| 2003/0074239 A1 * | 4/2003 | Hoffman et al. | 705/7 |
| 2004/0260513 A1 * | 12/2004 | Fitzpatrick et al. | 702/182 |
| 2005/0154560 A1 * | 7/2005 | Fitzpatrick et al. | 702/182 |
| 2006/0186197 A1 * | 8/2006 | Rosenberg | 235/380 |
| 2006/0218057 A1 * | 9/2006 | Fitzpatrick et al. | 705/28 |
| 2008/0270324 A1 * | 10/2008 | Allard et al. | 705/400 |

OTHER PUBLICATIONS

Observing behaviour by Computer Wilkie, T. Scientific Computing World 64:42-4, Cambridge Publishers (May 2002).*

* cited by examiner

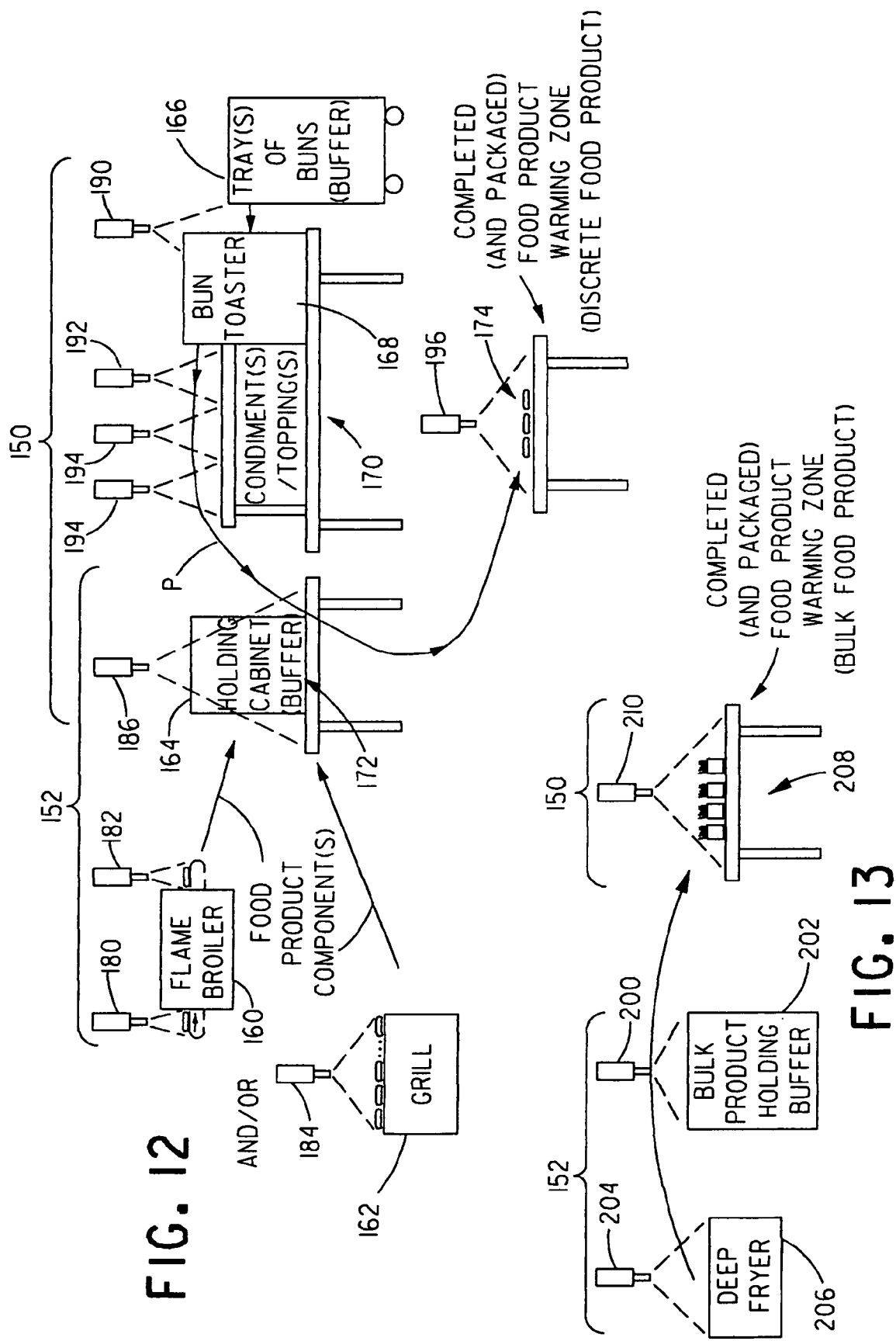

VISION-BASED MEASUREMENT OF BULK AND DISCRETE FOOD PRODUCTS

CROSS REFERENCE TO RELATED APPLICATIONS

The present application is a continuation-in-part of co-pending U.S. patent application Ser. No. 11/032,547, filed Jan. 10, 2005, and a continuation-in-part of co-pending U.S. patent application Ser. No. 10/823,027, filed Apr. 13, 2004, both of which are incorporated herein by reference.

BACKGROUND OF THE INVENTION

1. Field of the Invention

The present invention generally relates to the restaurant industry, and, more particularly, to a system and method of real-time electronic prediction and management of food product demand, especially in quick-service restaurant industry.

2. Description of Related Art

The quick-service (or fast food) restaurant industry's primary value proposition is speed-of-service—i.e., how quickly the restaurant can deliver a complete meal after a customer has placed an order. Quick-service restaurant operations are built upon the concept of preparing a limited menu of food product before customers place their orders. By preparing food ahead of time and keeping it warm in a holding buffer, restaurant employees can quickly grab food product from the buffer, bag it, and hand it to a customer. This faster speed-of-service enables quick-service restaurants to serve many more customers during busy mealtimes than a traditional sit-down restaurant.

In order to efficiently serve the customers (e.g., during a "rush hour"), a restaurant manager must carefully manage the "buffer level"—i.e. the amount of each food product that employees make and store in the holding buffer throughout the day. The restaurant manager needs to ensure that sufficient food product is on hand to meet anticipated demand, but must also ensure that the food product doesn't sit too long before being served, as food product quickly deteriorates after being prepared. Ideally, restaurant managers would like to buffer exactly the right amount of food product to serve consumers over the next few minutes. Unfortunately, it's difficult for managers to know how many consumer orders they will receive over the next few minutes, so they are forced to buffer "extra" product, just to be safe.

The buffer management problem is fundamentally a trade-off between the quality of the restaurant's food and the speed with which the restaurant can serve customers. The management of this trade-off is one of the largest drivers of the restaurant's profitability, as speed-of-service drives sales as long as quality is maintained. Despite its importance to the industry, restaurant managers can do little more than make "educated guesses" as they lack one critical piece of information—when will the consumers arrive?

The restaurant industry's state-of-the art solutions are based on data-mining historical sales information to predict future ordering patterns. Each restaurant typically saves a multi-week history of its sales volumes for each product. For example, sales data of the past 70 days may be stored and analyzed. The data-mining software then averages product volumes for discrete time windows (called "day parts") throughout the day—e.g., 15 or 30 minute windows are common, for each day of the week. The day-parts printout might suggest, for example, keeping 2 bins of patties on hand from 11:00 to 11:30, and then increasing the buffer to 3 bins from 11:30 to 12:00.

In another approach to buffer management, a program makes the determination of when to buffer completed sandwiches based on the same theory of analyzing historical sales data, except that, in this approach, the sales data for the sale in the last few minutes of popular completed sandwiches (e.g., cheeseburgers) is reviewed. Thereafter, the program calculates the number of completed cheeseburgers to buffer as a function of the number of cheeseburgers sold within the last few minutes. Thus, again, the food production decision is based upon historical information (i.e., sales that have already occurred).

The current approach is based on the underlying assumption that "future product demand will be very similar to historic (or past) product demand". This assumption is relatively true when product demand is averaged over large time windows, for example over a day. Restaurants can have relatively high confidence that they will sell roughly the same number of cheeseburgers today as they did yesterday—assuming that prices do not change.

However, the current approach does not allow restaurant resources to be managed on a real-time basis because the variability of the correlation between past and future demand events is too large. In other words, historic information does not allow restaurant managers to know with confidence the demand that their restaurant will see over the next several minutes; however, restaurant performance (speed and quality) would benefit significantly if product demand could be predicted accurately within the secondary shelf life of the restaurant's food products.

The current approach suffers because it infers future demand from historic demand, rather than taking a direct measurement of future demand. The reliability of the inference (i.e., the correlation between the inferred demand and the actual demand) depends upon the time window under consideration. The current approach works fairly well when demand is correlated across large time windows (e.g., predicting the number of patties that will be consumed across a day). The current approach becomes progressively less accurate as the time window shrinks. Further, current "inventory management systems" are inadequate to the needs of the restaurant industry because they do not account for the limited secondary shelf life of food products.

As a result, data mining of historical sales generates demand estimates with relatively large ranges. For example, in one restaurant, data mining may result in a prediction that for peak periods of the day the kitchen staff should pre-produce 4-7 bins of burger patties. If each bin holds 18 patties, the range of production is 72 to 126 patties. Such production predictions may be accurate (i.e., the predictions may handle the customer demand during the peak periods) only because the range (which is 126−72=54 patties) is so large. Unfortunately, large variances leave the restaurant vulnerable to overproduction and, in practice, provide little more than rough production guidelines.

The area of management of food processing and food production facilities, such as the preparation of frozen dinners, differs significantly from the production problems in quick-service restaurants because it is not a real-time management of food processing and food production. Processing facilities schedule production and make production decisions based upon sales forecasts that are weeks and months ahead. Production times and rates can vary far more than in quick-service restaurants, with little effect, as the output of the facility is destined for warehousing and distribution facilities.

Where quick-service restaurants must make minute-by-minute decisions, production facilities can often afford to make daily, or even weekly production decisions. Thus, the needs of production facilities and quick-service restaurants vary greatly. The decisions to be taken at a food processing facility are not impacted by the minute-by-minute changes in the demand for that facility's products.

Therefore, it is desirable to improve a restaurant's demand prediction accuracy so as to enable restaurant managers to use their production resources more efficiently—increasing same-store profitability by improving speed-of-service, food product quality, and reducing food product wastage. More accurate demand prediction enables restaurant operations to:

(1) Avoid under-production because under-production slows the restaurant's speed-of-service. When the buffer runs out of a certain food product, then customers must add the food production time (often a few minutes) to their wait time. This is especially problematic for a serial queue, like a drive-thru where every customer in line must add the food production time to his or her wait time. Under-production can seriously damage the restaurant's profitability by reducing the number of customers served during peak meal times.

(2) Avoid over-production because over-production reduces the restaurant's food quality and increases wastage, as food product spends too much time in the bin. If the food products bin time exceeds the secondary shelf life, then it must be wasted.

(3) Minimize bin time because minimizing bin times means hotter, fresher food products-a well-known market share driver. Restaurants would prefer to minimize the amount of time that food products spend in the buffer.

(4) Pre-produce completed products because accurately buffering completed products can significantly drive the restaurant's sales by improving the restaurants speed-of-service. Restaurants can buffer both food product components (e.g., burger patties) and completed food products (e.g., plain cheeseburgers); however, the secondary shelf life of a completed food product is much shorter (2-3 minutes) than that of a food product component (30 minutes).

(5) Reduce "wasteful" production when a restaurant attempts to buffer completed food products based on the historical sales data approach. This method is open to a significant number of incorrect guesses, which not only waste the food product (e.g., unused sandwiches or cheeseburgers), but also consume valuable production time that was allocated to making a product that no one used.

As discussed before, a fundamental limitation of the current approach is that the analysis of historical data only infers a range of probable future demand. It is therefore further desirable to improve the accuracy of future demand prediction using a method that moves beyond inference—to a direct measurement of demand or leading indicators of demand. In other words, it is desirable to base future food production decisions on the number of customers currently on the restaurant property who have not yet placed orders (i.e., sales that have not yet occurred, but are likely to occur within the next several minutes). Direct measurements of demand will enable restaurants to improve the economic efficiency of their real-time production operations—ensuring that production resources are assigned to profit-enhancing tasks.

SUMMARY OF THE INVENTION

The invention is a method of real time food production management. The invention includes (a) electronically predicting, based on real time data, demand for an amount of food to be ordered at a food outlet in a specified interval immediately succeeding the generation of said real time data; (b) electronically determining, based on real time data, at least one of the following: an amount of completed food product in inventory; and an amount of food product that is being assembled into completed food product; (c) serving completed food product from said inventory to patrons of said food outlet; and (d) electronically performing at least one of the following in real time: (1) determining an amount of additional food product requiring preparation beyond the amount of completed food product in inventory and the amount of food product being assembled into completed food product in order to satisfy said predicted demand for an amount of food to be ordered; (2) determining an interval of time at least one completed food product has been in inventory; (3) determining an interval of time that a cooked food product component has resided in a cooked food product buffer; (4) determining an interval of time to assemble at least one completed food product; and (5) determining an amount of at least one of the following: (i) a food product component; (ii) a condiment; and (iii) a topping residing in a food product assembly buffer based on an initial amount in said buffer and at least one of the following: the predicted amount of food to be ordered, the amount of completed food product in inventory, and the amount of food product being assembled into completed food product.

In the method, at least one of the amount of completed food product in inventory and the amount of food product being assembled into completed food product can be electronically determined via one or more electronic sensors. At least one of the electronic sensors can be a color camera or an infrared camera.

The invention is also a real time food production management system that includes: means for electronically generating first real time data food consumers inside or in the vicinity of a food outlet and at least one of the following: (i) an amount of prepared food available to serve and (ii) an amount of food being prepared; means for electronically predicting, based on said real time data, a demand for an amount of food to be ordered by said food consumers in a specified interval immediately succeeding the generation of said real time data; and means for electronically determining, based on second real time data, at least one of: (1) a predicted amount of additional food requiring preparation in excess of the amount of prepared food and the amount of food being prepared in order to satisfy said predicted demand for the amount of food to be ordered; (2) an interval of time at least one prepared food product has been available to serve; (3) an interval of time that a cooked food component that can be incorporated into food being prepared has been cooked; and (4) an amount of at least one of the following: (i) a food component; (ii) a condiment used in the food being prepared; and (iii) a topping used in the food being prepared residing in a food product assembly buffer based on an initial amount in said buffer and at least one of: the predicted amount of food to be ordered, the amount of prepared food product available to serve, and the amount of food product being prepared.

The means for electronically generating real time data can include at least one electronic sensor and a computer operative for processing the real time data electronically generated by said sensor. The electronic sensor can be a color camera.

The invention is also a real time food production management system. The system includes a plurality of sensors situated inside and in the vicinity of a food outlet for electronically tracking objects inside and in the vicinity of a food outlet to generate electrical signals containing information about: the presence of food consumers inside and in the vicinity of said food outlet; and at least one of the following: (i) an amount of prepared food in inventory and (ii) an amount of food product being prepared; and a computer containing a program code, which, upon execution by a processor in said computer, causes said processor to perform the following in real time: analyze said electrical signals to generate digital data about said food consumers and the at least one of said amount of prepared food product in inventory and said amount of food product being prepared; predict, based on said digital data, demand for an amount of food product to be ordered by said food consumers a time following generation of said digital data; and determine, based on said digital data, at least one of the following: an amount of food product requiring preparation in excess of the at least one of the amount of prepared food product in inventory and the amount of food product being prepared in order to satisfy said predicted demand; an interval of time at least one prepared food product has been in inventory; an interval of time that a cooked food product component that can be incorporated into a food product begin prepared has been cooked; an interval of time to prepare at least one prepared food product; and a buffer level of at least one of the following: (i) a food product component; (ii) a condiment used in the preparation of food product; and (iii) a topping used in the preparation of food product, based on an initial level in said buffer and at least one of: the predicted amount of food to be ordered, the amount of prepared food product in inventory, and the amount of food product being prepared.

The food product can be discrete food product, bulk food product or some combination of discrete and bulk food product.

The invention is also a method of real time food production management. The method includes electronically generating real time data about at least one of (i) an amount of prepared food product in inventory and (ii) an amount of food product being prepared; and electronically determining, based on said real time data, at least one of the following: when to dispose of at least one prepared food product that has been in inventory exceeding a first interval of time; when to dispose of at least one cooked food component that that has been available for incorporation into food product being prepared for an interval exceeding a second interval of time; a time to commence preparation of at least one food product for inventory; and a level of a buffer of at least one of the following that can be incorporated into food product being prepared: (i) a food product component, (ii) a condiment, and (iii) a topping.

The step of electronically generating real time data can include electronically tracking and counting at least one of the following: one or more food product components that can be incorporated into food product being prepared, one or more food products being prepared and one or more prepared food products in inventory.

The method can further include electronically estimating, in real time, a remaining time before at least one buffer is empty; electronically comparing said remaining time to a predetermined interval of time for restocking said one buffer; and electronically generating, as a function of said comparison, a signal to restock said one buffer.

The remaining time before said one buffer is empty can be electronically determined based on at least two of the following: an initial level in said buffer, the amount of prepared food product in inventory, a time derivative of the amount of prepared food product in inventory, the amount of food product being prepared, a time derivative of the amount of food product being prepared, a predicted amount of prepared food product to be ordered and a time derivative of the predicted amount of prepared food product to be ordered.

The predicted amount of prepared food product to be ordered can be determined electronically by performing the following in real time: electronically generating real time data about food consumers in a predetermined location; selecting one or more queuing models from a plurality of queuing models; inputting relevant portions of the electronically generated real time data about said food consumers into the respective one or more queuing models selected; and simulating each of said one or more queuing models after inputting said relevant portions of said real time data thereinto.

The predicted amount of prepared food product to be ordered can be predicted empirically.

The electronically generated real time data can be generated by a computer configured to acquire and process image data from each of one or more sensors positioned to view the at least one of prepared food product in inventory and food product being prepared.

The at least one sensor can be either a color camera or an infrared camera.

The invention is also a real time food production management system comprising: means for electronically generating real time data about at least one of (i) an amount of prepared food product in inventory and (ii) an amount of food product being prepared; and means for electronically determining, based on said real time data, at least one of the following: when to dispose of at least one prepared food product that has been in inventory exceeding a first period of time; when to dispose of at least one cooked food component that that has been available for incorporation into food product being prepared for more that a second period of time; a time to commence preparation of at least one food product for inventory; and a level of a buffer of at least one of the following that can be incorporated into food product being prepared: (i) a food product component, (ii) a condiment, and (iii) a topping.

The means for electronically generating real time data can include means for electronically tracking and counting at least one of: one or more food product components that can be incorporated into food product being prepared, one or more food products being prepared and one or more prepared food products in inventory.

The method can further include: means for estimating a remaining time before at least one buffer is empty; means for comparing said remaining time to a predetermined interval of time for restocking said one buffer; and means for generating, as a function of said comparison, a signal to restock said one buffer.

The means for generating real time data can include a computer configured to acquire and process image data from each of one or more sensors positioned to view the prepared food product in inventory and/or the food product being prepared.

Lastly, the invention is a food production management system that includes a plurality of buffer manager systems, each configured to electronically generate operational data comprising real time data and data generated from said real time data, said real time data including at least one of (i) an amount of prepared food product in inventory and (ii) an amount of food product being prepared, said generated data including at least one of the following: when to dispose of at least one prepared food product that has been in inventory exceeding a first period of time; when to dispose of at least one cooked food component that that has been available for incorporation into food product being prepared for more that a second period of time; when to commence preparation of at least one food product for inventory; and a level of a buffer of at least one of the following that can be incorporated into food product being prepared: (i) a food product component, (ii) a condiment, and (iii) a topping. The system also includes a central computer communicatively coupled to each buffer manager system via a communication medium. The central computer is operative to receive and aggregate operational data from each buffer manager system and to analyze said operational data for trends across said buffer manager systems related to at least one of the following: food quality, time of service and/or revenue generating capacity.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 12 is a schematic view of an exemplary grill interface and an exemplary assembly interface for processing of discrete food product components, condiment(s) and topping(s) into completed food product, the storage of discrete food product components and packaged completed food products, and the delivery of packaged completed food product to a patron in accordance with the embodiment of the buffer manager system shown in FIG. 11;

FIG. 13 is a schematic view of an exemplary grill interface and an exemplary assembly interface for the processing, storage and delivery of bulk food product(s) in accordance with the embodiment of the buffer manager system shown in FIG. 11.

DETAILED DESCRIPTION OF THE INVENTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for the purpose of clarity, other elements found in typical quick-service (or fast food) restaurants.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment. It is further noted that although the discussion below refers to a quick-service or fast food restaurant, the discussion equally applies to any restaurant or food outlet and is not limited to a fast food restaurant setting. Further, the term "food" may include a "solid" (e.g., burger, fries, sandwiches, etc.) as well as a liquid (e.g., coffee, carbonated drinks, juice, etc.) edible product. Also, the term "buffer manager", as used hereinbelow, refers to a computer unit, computing software, or any other electronic device that is configured to electronically perform real-time prediction of food demand by executing various steps as illustrated, for example, in FIG. 4. The buffer manager may operate in conjunction with one or more sensors and other data input devices as discussed below with reference to FIG. 2. Such generally-available sensors or data input devices may or may not form part of the entire buffer management system according to the present invention depending on the type of implementation as discussed with reference to FIGS. 2 and 3 below.

Figure 1:
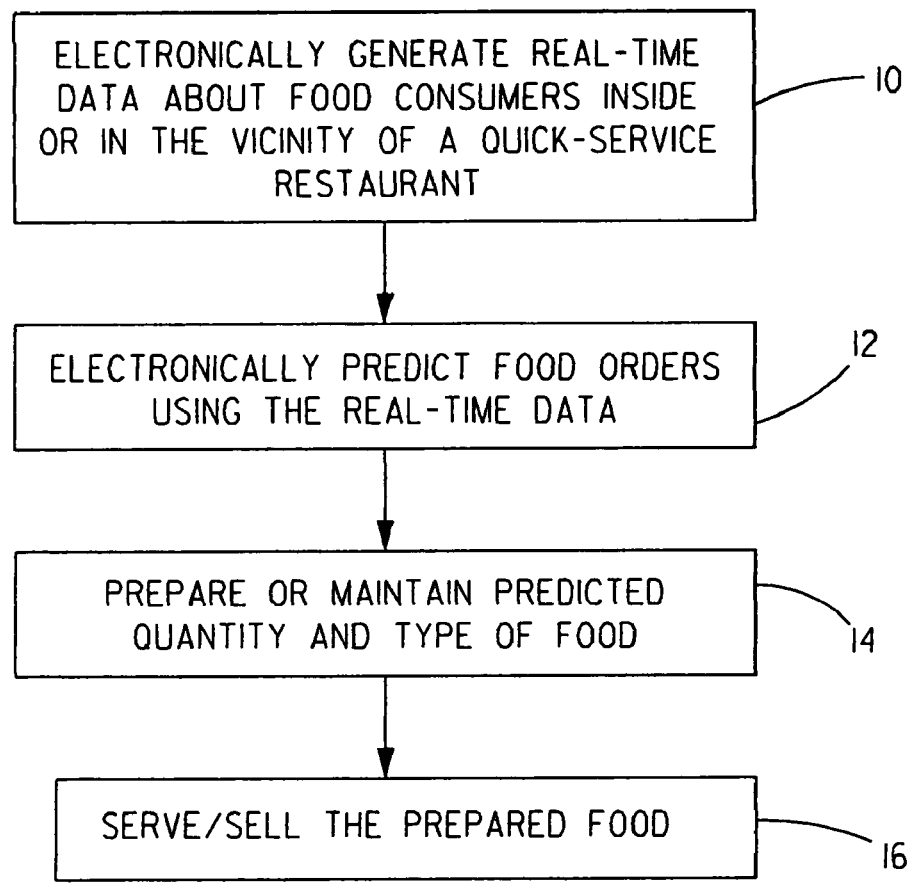
FIG. 1 illustrates a general flowchart depicting steps involved in operating a quick-service restaurant according to one embodiment of the present invention.

FIG. 1 illustrates a general flowchart depicting steps involved in operating a quick-service restaurant according to one embodiment of the present invention. A food buffer manager according to one embodiment of the present invention electronically generates, in real-time, data about food consumers inside or in the vicinity of the quick-service restaurant (block 10). A food buffer is the holding buffer in a quick-service restaurant where food that is prepared ahead of time is kept warm and from which restaurant employees can quickly grab the ordered food product, bag it, and hand it to the customer. Generally, there are two kinds of food buffers in a quick-service restaurant: those that hold completed food products (typically called "bins"), and those that hold cooked food product components (typically called "cabinets" or "component buffers"). The restaurant employees can quickly fulfill an order by custom making a sandwich from the food product components that are stored in a cabinet or component buffer. The buffer manager calculates optimal buffer levels based on measurements of impending demand in real-time. The buffer manager may be distinguished from the traditional methods, where buffer level calculations are not determined from real-time demand measurements, but from historical demand measurements.

The demand that a quick-service restaurant will see over the next 3-5 minutes can be quickly estimated manually by standing on the roof of the restaurant and watching the traffic flow, both vehicle and pedestrian, through the property. It is assumed that people are coming to the restaurant to buy food. If it can be known how much food the average person orders, then one can form a good estimate of how much food needs to be cooked ahead of time, simply by counting cars and people entering the property. The buffer manager may calculate optimal buffer levels, for both completed products and product components, based on real-time counts of restaurant patrons throughout the restaurant's property (block 10, FIG. 1). In one embodiment, as discussed in more detail later, the buffer manager employs a computer vision system, running a series of 2D image processing techniques that detect and track vehicles and people in several camera views, wherein the cameras can be positioned both internal and external to the restaurant. The system's cameras may be pointed at any of several key locations throughout the restaurant property, including the property's entrance and exits, the drive-thru lane, the parking area, the restaurant's entrance and exit doors, and the front counter area. Thus, the buffer manager, when installed with appropriate sensors, monitors customer flow and estimates food production needs in real-time.

Computer vision technology may be used to measure leading indicators of impending demand including, for example, the arrival and movement of people and vehicles throughout the restaurant's property. The number of burger patties and fries (for example) that the restaurant will need to cook can be quickly estimated from the number of cars entering the property. In one embodiment, alternatively, the number of burger patties and fries (for example) that the restaurant will need to cook can also be quickly estimated from the number of people in line at the counter. More accurate estimates of when these products will be ordered can be made by noting how long it takes for patrons to reach an order panel, sales counter or employee capable of taking a patron's order.

In one embodiment, the buffer manager can also observe how many vehicles are in the drive-thru and how quickly the drive-thru is moving to estimate when future drive thru orders will be placed. The buffer manager can also note how many vehicles are parked, how long it takes for customers to walk from their vehicles to the counter, and how long it takes for employees to take a customer order, to estimate when future counter orders will be placed. Thus, the demand indicators may also include, for example, customer ordering pattern, drive-thru delay, waiting time before ordering, time taken by an employee to take an order, etc.

Patron counts are fed from the computer vision system into a queuing model (also a part of the buffer manager) that estimates when each patron will arrive at an ordering station. Simultaneously, a parametric observer may take inputs from the kitchen crew to track several key pieces of production information including the number of products and components in the buffer, and average service times for ordering and production. The buffer manager may then electronically estimate the probable demand for completed food products and food product components as a function of time, based on the number of patrons detected and the estimated time for them to arrive at an ordering station as given at block 12 in FIG. 1. The prediction of food orders using real time data may then be displayed to the kitchen crew or sent as direct commands to appropriate automated food production equipment, who can prepare or maintain the required food products and food product components (block 14) for serving or selling to the restaurant patrons (block 16).

Figure 2:
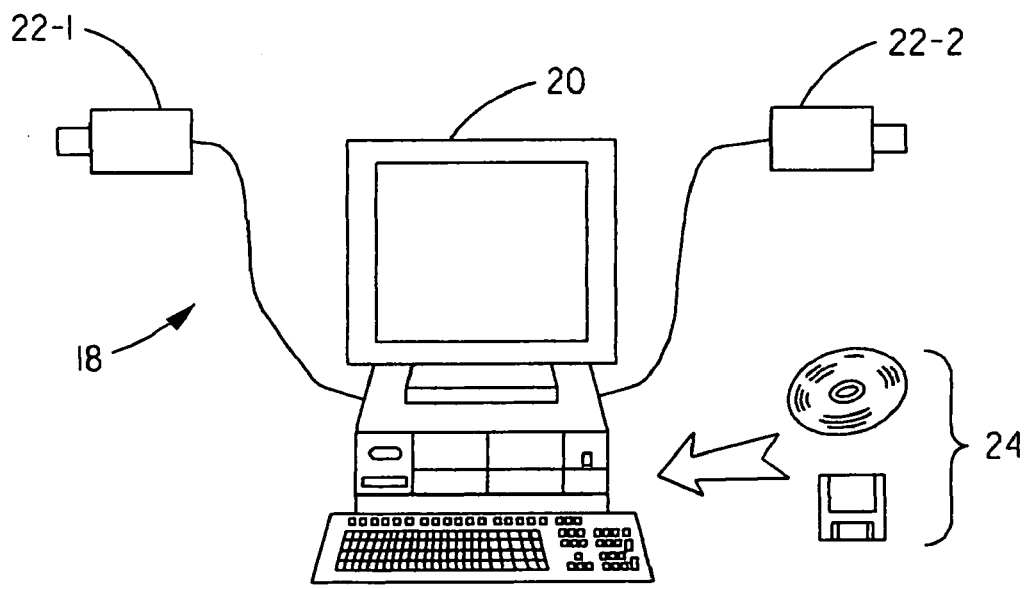
FIG. 2 shows an exemplary food buffer manager system according to one embodiment of the present invention.

FIG. 2 shows an exemplary food buffer manager system 18 according to one embodiment of the present invention. The system 18 may includes a computing unit 20 that receives and processes data received from a number of sensors 22-1, 22-2 located/placed inside and in the vicinity (or surrounding) a quick-service restaurant building. Although only two sensors 22-1 and 22-2 are illustrated in FIG. 2, it is observed that there may be many more sensors feeding data (e.g., customer arrival, drive-thru car progress, etc.) to the computing unit 20 as illustrated, for example, in FIG. 3. The computing unit 20 may internally store (e.g., in the unit's hard drive or other permanent storage memory/facility within the unit) appropriate program code that, upon execution by one or more processors in the computing unit 20, may allow the computing unit 20 to perform the buffer manager functionality. In one embodiment, the computing unit 20 is a Windows.RTM. based personal computer. However, a computer running on any other operating system (e.g., Linux.RTM.) may also be configured to perform the buffer manager functionality. The program code may be written in C, $C^{++}$, or in any other compiled or interpreted language suitably selected. The necessary software modules for the program code may be designed using standard software tools including, for example, compilers, linkers, assemblers, loaders, bug tracking systems, memory debugging systems, etc.

On the other hand, as shown in FIG. 2, the program code may reside on an external computer-readable, tangible data storage medium 24 (e.g., a compact disc, an optical disc, a magnetic storage medium such as a floppy disk, etc.) allowing ease of software portability and system management. More updated version of the program code may then be easily loaded onto the internal memory of the computer 20 to enable the computer 20 to perform more sophisticated and advanced data and image processing operations according to the present invention.

Customer arrival measurement (as discussed later hereinbelow) may be performed with any of a number of sensors 22 including mechanical, electrical, and chemical sensors. Mechanical sensors may include a wide variety of switches, such as piezoelectrics, pneumatic pressure switches, etc. Electrical sensors may include magnetic loop sensors, laser beam switches, and cameras (e.g., video surveillance cameras). Chemical sensors may also be used to detect vehicle passage by measuring changes in CO (carbon monoxide) or $CO_2$ emissions. A particular implementation of a single type of sensor or a combination of different types of sensors 22 may be based upon the relative cost/benefit of the approach. Some other sensing methods and approaches include:

(1) Radiative Sensing—The application may require a sensor capable of detecting vehicles and people through the restaurant's property. Radiative sensors such as cameras, lasers, or sonar may be used to sense such objects in a relatively large field of view and at a distance. The ability to detect an object far from an ordering panel, in order to provide the kitchen with sufficient warning, especially recommends the use of radiative sensing. In one embodiment, the radiative sensing is used to provide a 2D (two-dimensional) image of the field of view of interest. Alternative sensors may also be used to extract 3D (three-dimensional) information from the same general field of view. The use of multiple cameras, for instance, may be used in conjunction with stereovision techniques to generate a 3D model of an object in the field of view. Alternatively, stereo cameras can be used to extract depth information from the scene (by establishing feature correspondence and performing triangulation) and aid in separating (partially) occluded people. Color information can also be used to disambiguate configurations in which spatial tracking alone is not sufficient.

Similarly, sonar sensors may be used with certain 3D processing techniques to generate 3D occupancy models for a given field of view. These and other techniques, including the use of color sensors, may be employed to construct a 3D image of the object in the field of view.

Similarly, infrared sensors can be used. In images captured by infrared sensors gray values in the image correspond to thermal emission from the corresponding scene elements. It has been shown that the thermal profile of a human face can be used successfully for recognition and tracking of faces independent of lighting conditions. Similar methods can be used to track whole bodies. In these algorithms infrared sensors are used in the same way that conventional image sensors would be used. The advantage of using infrared imagery lies in easier separation from the background and independence of lighting condition. A completely different scheme uses ceiling mounted infrared sensors which monitor a relatively small area of the floor underneath. Since humans are typically much warmer than the floor they can easily be detected and tracked.

While the majority of systems for tracking people are based on passive imaging sensors active sensors such as laser range finders can also be used. In contrast to vision systems, lasers are restricted to a 1D projection of the scene. However, the depth information obtained from a laser range finder is typically of high accuracy (e.g. about 5 cm) which distinguishes laser range finders from other range sensors based on e.g. ultrasound. In a system comprised of multiple laser range finders, laser range finders may be employed to precisely track objects through a space.

(2) Contact or Field Sensors—A general alternative to radiative sensing is to employ some type of contact or field sensor, such as a limit switch, a pressure switch or a magnetic loop sensor. For example, a mechanical pressure switch may be laid across the restaurant entrance, generating a "click" each time a car drove across the switch. However, there may not be desirable cost/performance for a pressure switch. There may be multiple problems with these sensors in practice, including: (i) Pressure sensors may actually cost more than a camera; (ii) Multiple sensors may be required to determine whether a vehicle is entering or exiting; (iii) Vehicles may only be detected and counted while in motion—a problem in the drive-thru where a vehicle may not move for some time; (iv) Error propagation grows as the sum of misinterpreted clicks; and (v) Difficult to generalize techniques to also detect people (as opposed to just detecting the vehicles). Thus, generally, although an acceptably accurate vehicle detection system can be built using contact or field sensors, the cost in practice may be too high for the achievable performance and reliability.

Methods of tracking humans and vehicles include, but are not limited to, model based tracking such as stick figure tracking, 2-D contour and volumetric models, as well as active-contour-based tracking, feature based tracking and face-only tracking. Each is described in more detail below.

The geometric structure of the human body can be modeled in a number of different ways. In model-based tracking a human body model is fit to the image by determining the optimal parameter settings in an energy-minimization framework. Different approaches distinguish themselves from each other by the type of model and the objective function to be minimized.

With respect to "stick figure tracking" a human body can be modeled as a combination of line segments linked by joints. In one instance, the silhouette of a human body is represented by a stick figure model containing ten links articulated with six joints. The optimal model fit is determined by energy minimization in a potential field. To reduce the search space prediction and angle constraints can be used. With respect to 2-D contour, a human body or vehicle can be modeled as a set of connected planar patches ("cardboard people"). Low-level detectors can be used to identify candidate regions for body parts (torso, upper and lower halves of each limb). A likely configuration of body parts in the image is determined using a so-called mixture of trees model. A similar approach uses a spectral graph partitioning framework to assemble candidate regions of body parts into a full body model. Similarly, with respect to volumetric models, in order to achieve view point independence and robustness against occlusion 3-D models such as elliptical cylinders, cones or spheres are used to describe the geometric structure of the human body. Motion propagation of the model across frames can be accomplished using an iterative extended Kalman filter.

Methods based on active contours (or "snakes") employ a representation of the bounding contour of the object to be tracked and update it dynamically over time. In one embodiment, the shape of a human body is represented using B-splines. The model parameters are updated using a Kalman filter formulation. More recent approaches can use a condensation filter to model the dynamics of the contour.

In feature-based tracking, sub-features such as distinguishable points or lines on the object are tracked rather then the body as a whole. In one embodiment, corner points of moving silhouettes are used as features to track. The feature points are matched across frames using a distance measure based on position and curvatures.

Lastly, the objective of tracking a person in an image sequence can also be achieved by robustly tracking the person's face alone. In one embodiment, a method for the tracking of faces in real time uses Active Appearance Models. The algorithm is able to handle wide pose changes and partial occlusion of the face.

It is noted here that it is possible to reliably detect vehicles in a parking lot of a restaurant when one knows roughly where to look, and what to look for. Further, the designer of the buffer management system according to the teachings of the present invention may have a wide selection of available sensing techniques from which to develop an acceptably accurate vehicle (and people) detection system.

Figure 4:
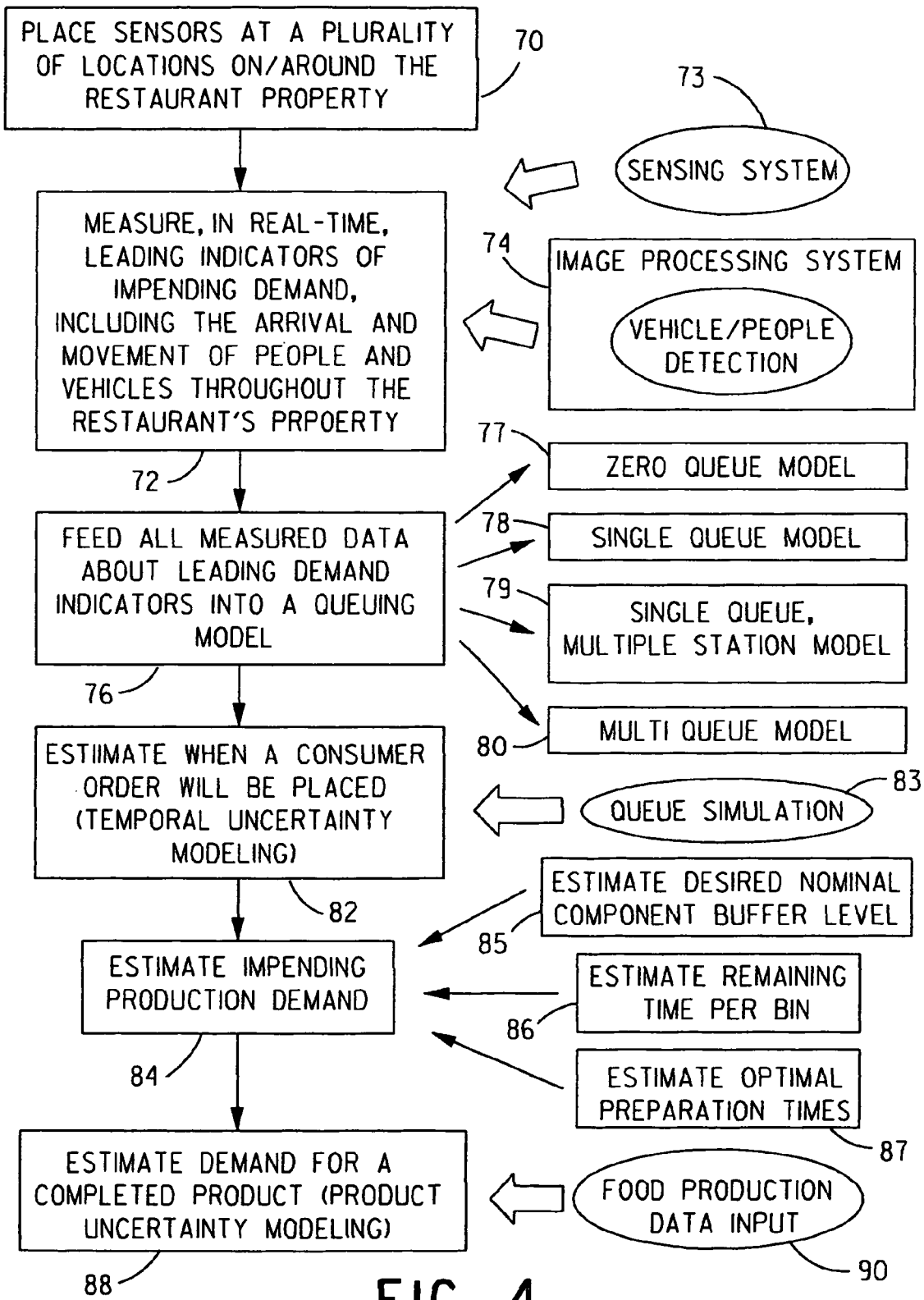
FIG. 4 is a flowchart showing exemplary steps involved in measurement and prediction of impending food demand in real-time according in accordance with the present invention.

As noted before, the term "buffer manager" may thus include the computer 20 with a program code stored therein to allow it to perform the buffer manager functionality according to the present invention (as illustrated, for example, in FIG. 4). However, the entire system 18 may be considered a "buffer manager" if, for example, a restaurant operator wishes to install sensors 22 and the computer 20 together from a single vendor instead of obtaining the computer unit 20 from one vendor and the sensors 22 from another. On the other hand, instead of a single computer 20, there may be more than one computing or processing units which jointly perform the buffer manager functionality as is done in a preferred embodiment discussed immediately below. In other words, the buffer manager functionality may be distributed among two or more processing units connected to one another via a network (e.g., the Ethernet) connection. Thus, the term "buffer manager" is used flexibly throughout the discussion and its meaning should be evident from the context of use.

In one embodiment, the sensors 22 for drive-thru and customer arrival areas are Visiontech black and white, weatherproof, standard security cameras (e.g., Vision-Tech VB19WB or VB19WW, Visiontech, Paso Robles, Calif.) with each camera rated at 0.5 lux and 380 line resolution. In one embodiment, the functionality of the computer 20 is implemented via three hardware components-all connected to one another via an Ethernet connection. The first hardware component is a demand prediction system that receives signals sent by the cameras. The first hardware component is a Shuttle SS50C computing system with Intel P4 (2 GHz) processor, 512 MB RAM, 20 GB hard disk space, and two (2) Winnov 1020 or 4400 AV framegrabbers (Winnov, Sunnyvale, Calif.). The second hardware component is a manager console, which is a Shuttle SS50C system with Intel P4 (2 GHz) processor, 256 MB RAM, 20 GB hard disk space, and a 10 Base 2 network card. The third hardware component is a kitchen production system, which is a Dell GX300 or GX260 computer system with Intel P3 (800 MHz) processor, 256 MB RAM, 10 GB hard disk space, built-in network card, two (2) integrated serial ports, integrated video, ATI video card (PCI), STB video card (PCI), and two (2) serial port expansion slots (PCI). The display of various information to the restaurant employees and data input from them into the buffer manager system are achieved via a number of serial-touch display terminals or interfaces. The display terminals or interfaces may be placed at a number of locations in the restaurant. In one embodiment, one display interface is placed at the grill area in the kitchen, the other is placed at the frying area in the kitchen, and a third one is placed at the food assembly area. Each display terminal or interface is a Datalux LMC 10 LCD touch screen monitor with 640×480 resolution, 200 nit brightness, and 250:1 contrast.

Figure 3:
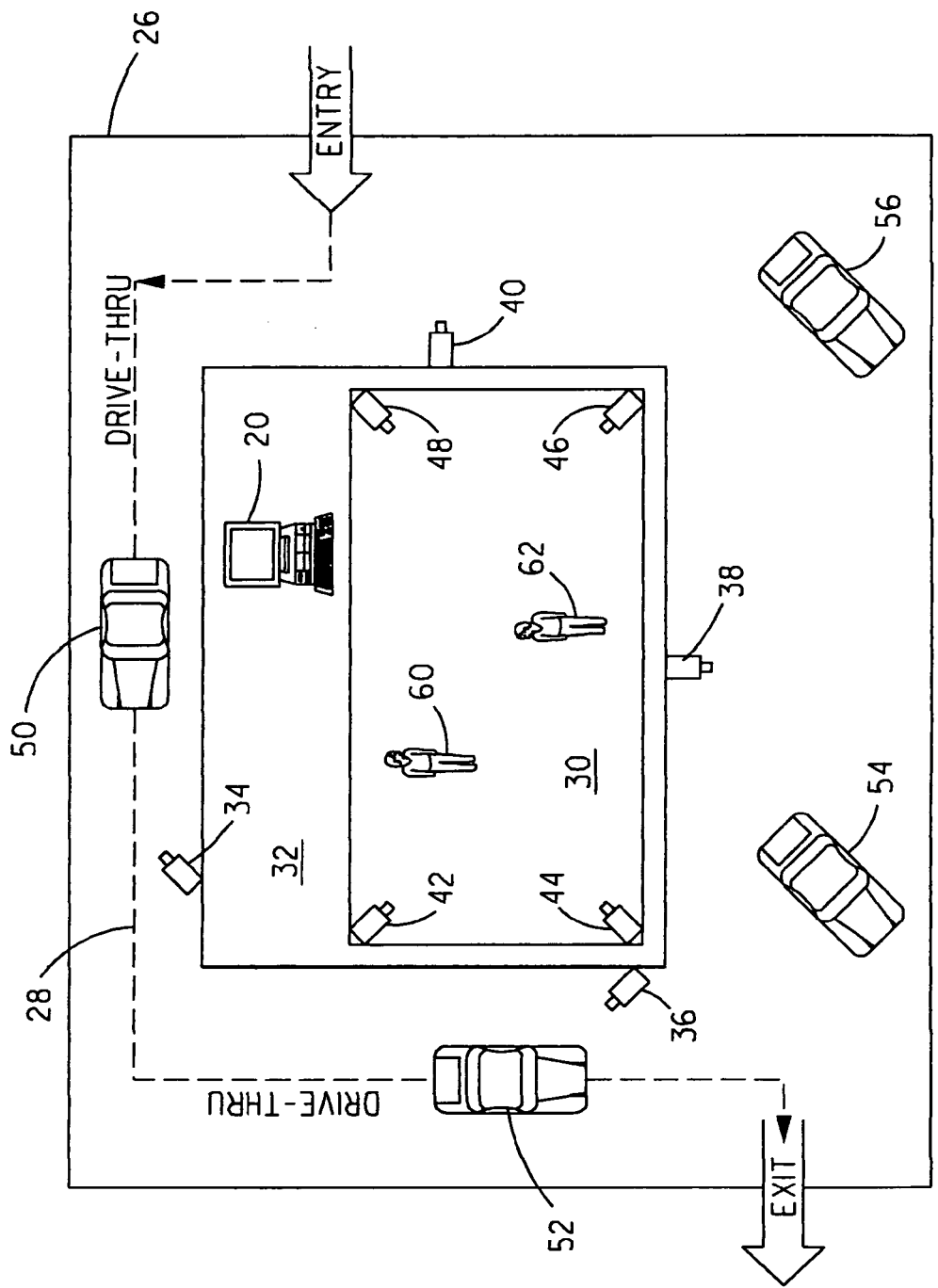
FIG. 3 is a depiction of a real life implementation of the buffer manager system in FIG. 2 in a quick-service restaurant.

FIG. 3 is a depiction of a real life implementation of the buffer manager system in FIG. 2 in a quick-service restaurant 26. The restaurant 26 is schematically depicted to have a drive-thru section 28, an eat-in/ordering area 30, and a front counter/order-taking area 32, which may include the food preparation/kitchen area (not shown separately). The computer 20 (also shown in FIG. 2) that is configured to perform the buffer manager functionality using the software or program code developed to implement the teachings of the present invention is shown placed in the counter area 32. The drive-thru section 28 is shown to have two vehicles 50, 52 in the ordering lane. The diagram in FIG. 3 also shows the entry and exit areas on the restaurant property. A couple of other vehicles (or cars) 54, 56 are also shown parked in the parking space provided for customers who wish to enter the restaurant and order and eat-in food there. It is observed that the diagram in FIG. 3 is just a schematic representation of a fast food restaurant or outlet, with two representative customers 60, 62 shown in FIG. 3. In reality, there may be many more cars or other vehicles on the restaurant property, there may be many customers inside the restaurant (i.e., in the eat-in area 30), or there may be more or less sensors placed at the restaurant than those shown in FIG. 3.

As discussed before, various types of sensors may be placed in and/or around the restaurant property. In FIG. 3, one such implementation is shown with four sensors 34, 36, 38, 40 located on the four outside walls of the restaurant eat-in establishment to detect and track vehicles and human traffic throughout the property, including the property's entrance and exits, the drive-thru lane, the parking area, the entrance and exit doors (not shown) of the eat-in area 30, etc. Similarly, four other sensors 42, 44, 46, and 48 are shown placed at different angular locations within the eat-in area 30 to monitor the front counter area 32 and also to monitor, for example, the number of patrons inside the establishment, the ordering pattern of the customers inside the restaurant building, how long it takes for a restaurant employee to take a customer's order, etc. As noted before and discussed in more detail later hereinbelow, various parameters tracked and measured by the sensors are sent to the computer 20 in real-time, which analyzes the sensor output data so as to estimate or predict, in real-time, the food product demand that the restaurant may experience in a predetermined time (e.g., next 3-5 minutes) immediately following the sensor measurements.

It is observed here that although FIG. 3 shows the computer 20 to be an integral part of the restaurant 26, that may not have to be necessarily so. For example, the computer 20 may be physically located at a remote location (e.g., a central headquarter of the restaurant franchisor, or at another restaurant in a chain of restaurants under common ownership) and only a display monitor or computer terminal may be provided in the counter area 32 to guide and instruct the kitchen staff. In such a setup, the remotely located computer 20 may be linked or connected to one or more "client" restaurants via one of many available high-speed data connection options, including, for example, cable-modems, WLL (wireless local loop) or any other wireless network, the Internet or any other similar data communication network, etc. The monitored data output from the sensors located at "client" restaurant may be sent over the high-speed connection to the remotely located buffer manager, which, in turn, may interpret (or process) the data supplied by the specific group of sensors at a specific restaurant and send back necessary food production and maintenance information (i.e., its prediction of impeding food orders) to that specific restaurant to guide the kitchen staff in food preparation. The operations of a buffer manager computer may be remotely monitored (preferably periodically) by another computer (not shown) to diagnose and prevent any malfunction or fault condition occurring at the buffer manager level. In one embodiment, food orders may be taken over a network (e.g., the Internet). In another embodiment, a food order delivery notification may be sent to a consumer over the network and the consumer, in turn, may pick up the ordered food at a designated location.

FIG. 4 is a detailed flowchart showing exemplary steps involved in measurement and prediction of impending food demand in real-time according to one embodiment of the present invention. It is noted that although the steps in FIG. 4 are illustrated in a sequential order, it is clear from the discussion given hereinbelow that one or more of the steps in FIG. 4 can be performed in an order that is different from that shown in FIG. 4. For example, the steps at blocks 84 and 88 in FIG. 4 can be performed simultaneously, i.e., these steps do not have to be performed sequentially. It is observed that the steps outlined in FIG. 4 are implemented using the buffer management system 18 shown in FIG. 2. In other words, upon receiving sensor outputs, the computer 20 processes the received data to electronically carry out all the steps (except step 70) illustrated in FIG. 4. The placement of sensors at a plurality of locations on or around the restaurant property (block 70) is already discussed hereinbefore with reference to FIG. 3. The sensors may comprise the sensing system 73, whose output is processed (in real-time) by the image processing system 74 to measure, in real-time, the leading indicators of impending demand, including, for example, the arrival and movement of people and vehicles throughout the restaurant's property, waiting time, ordering pattern, drive-thru delay, etc. The data measured at block 72 is fed as an input to an appropriate queuing model (discussed later hereinbelow) to estimate time of arrival for each patron at the front counter/ordering panel. Each queuing model shares a common set of model parameters—the arrival time and the service time. The arrival time indicates the time at which a new patron (person or vehicle) enters the queue (including the drive-thru queue). The service time indicates the amount of time spent servicing an individual patron prior to that patron exiting the queue. These model parameters may be estimated, either through direct measurement or the construction of a parametric observer.

The queuing models predict the time at which a customer will reach an order panel based on the customer's arrival time, the number of other customers in the queue, and the queue's average service time. In one embodiment, the buffer management system 18 uses cameras and 2D image processing techniques to measure the arrival time of each customer.

Sensing System 73

Various types of sensors and their utilities are described hereinbefore. Although a preferred embodiment uses cameras and 2D image processing techniques to measure the arrival time of each customer, however, as noted before, the buffer management according to the present invention can be equally performed with any of a number of other sensor and data processing techniques. Cameras and 2D image processing may be chosen primarily due to cost constraints. 3D sensing techniques, albeit more expensive, may be preferable for higher performance results. Fundamentally, the arrival time measurement system provides for the accurate detection and/or tracking of an object within a field of interest. The field of interest must be located far enough away from the ordering panel (i.e., the front counter area 32 in FIG. 3, which includes one or more ordering windows for drive-thru customers) such that detection of an arriving object provides the restaurant with sufficient warning that the kitchen can take action before the customer arrives at the ordering panel.

A sensor's required look-ahead may be determined from the restaurant's usual performance characteristics. If the restaurant requires an average service time $T_b$ to perform a task, such as cooking a batch of fries, or preparing a batch of burgers; and an average service time $T_a$ to assemble a burger, then the sensor should be placed at least $S*(T_a+T_b)$ from the order panel. The parameter S, in this case, indicates the average speed of the consumer. Sensor placement is a function of the restaurant's performance—higher performance restaurants do not require as much warning time to react to changes in consumer demand.

Image Processing System 74

In one embodiment, the computer 20 employs 2D image processing of several camera images in order to detect customers throughout the restaurant's property. It is noted that each queuing model may require a potentially different set of customer arrival measurements. The following discusses several 2D image-processing algorithms that are used for object detection, localization, and/or tracking. In addition, image-processing methods that improve the quality of the image-processing algorithms are also discussed. It is again noted that there are several alternative methods of implementing object detection. The methods described herein have been chosen for their cost/performance benefits in certain vehicle/people detection applications according to one embodiment of the present invention.

Figure 5:
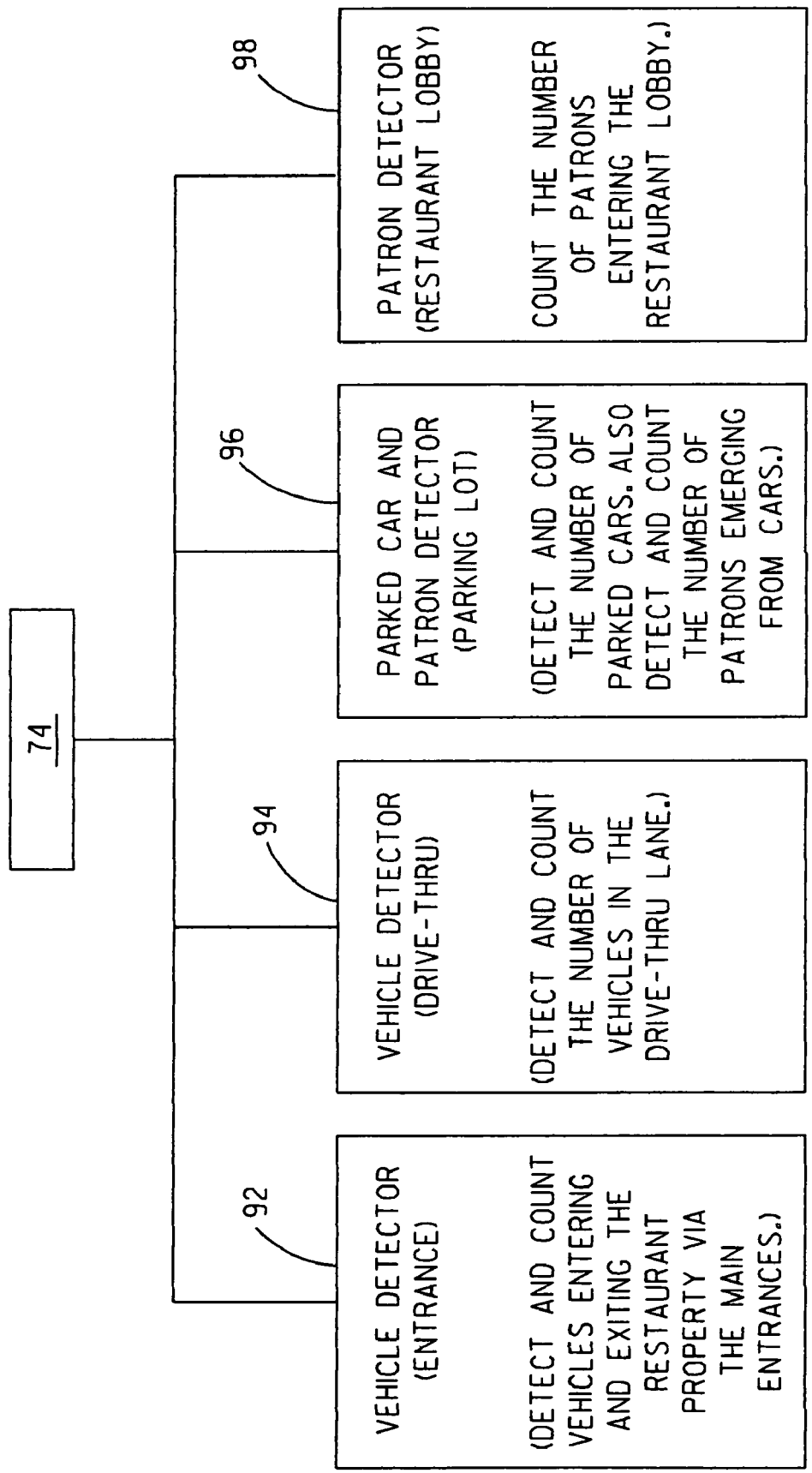
FIG. 5 is a block diagram of various detector units employed by an exemplary food buffer manager in accordance with the present invention.

FIG. 5 shows various detector units employed by an exemplary buffer manager as per the teachings of the present invention. The software module that performs people and/or vehicle detection in the image processing system 74 may include one or more of the following detector units: (i) an entrance vehicle detector 92 that detects and counts vehicles entering and exiting the restaurant property via restaurant's main entrance, (ii) a drive-thru vehicle detector 94 that detects and counts the number of vehicles in the drive-thru lane, (iii) a parking lot detector 96 that detects and counts the number of parked cars, and also detects and counts the number of patrons emerging from the cars, and (iv) a restaurant lobby detector 98 that counts the number of patrons entering the restaurant lobby or eat-in area 30.

Figure 6:
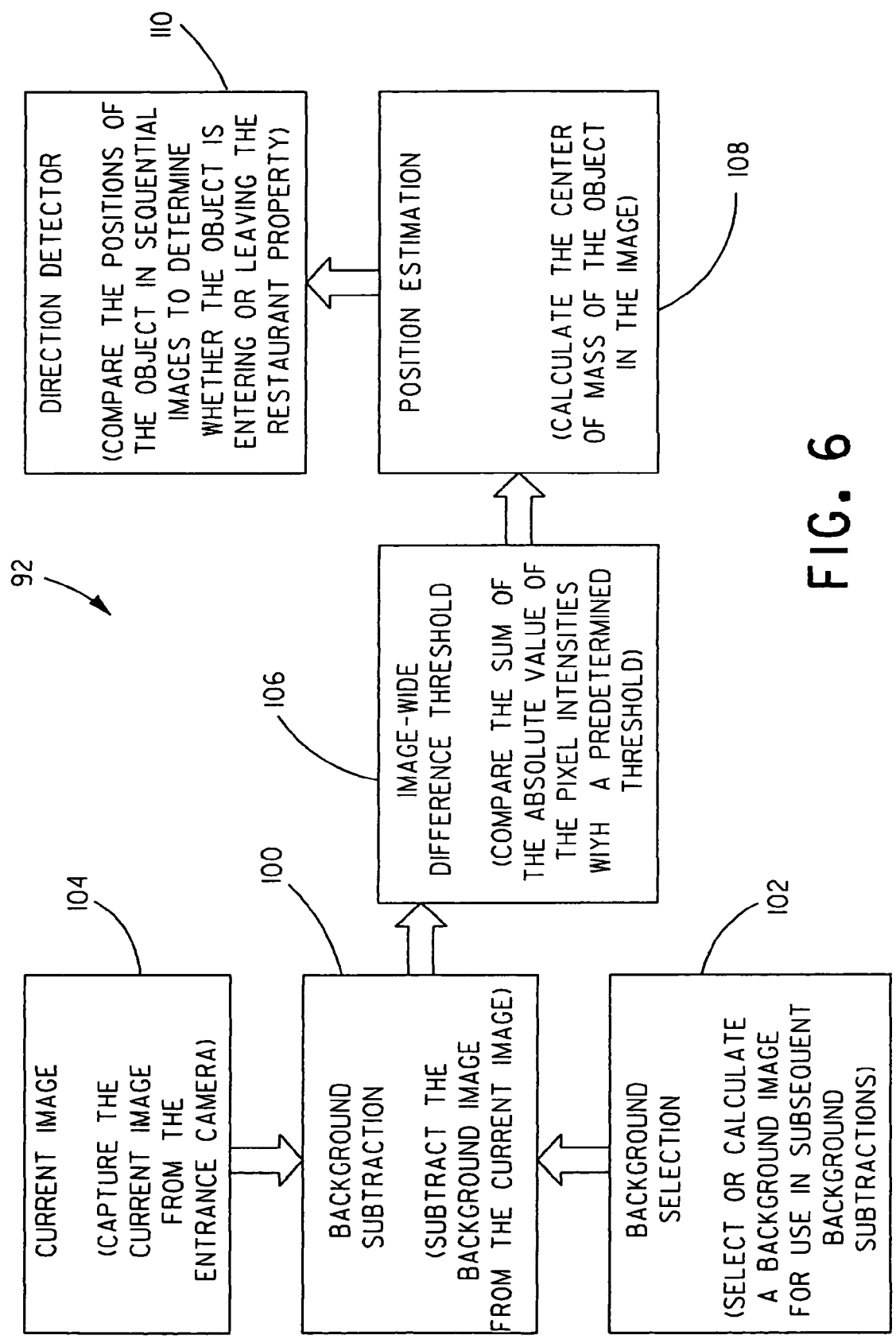
FIG. 6 is a block diagram of an exemplary entrance detector architecture.
Figure 7:
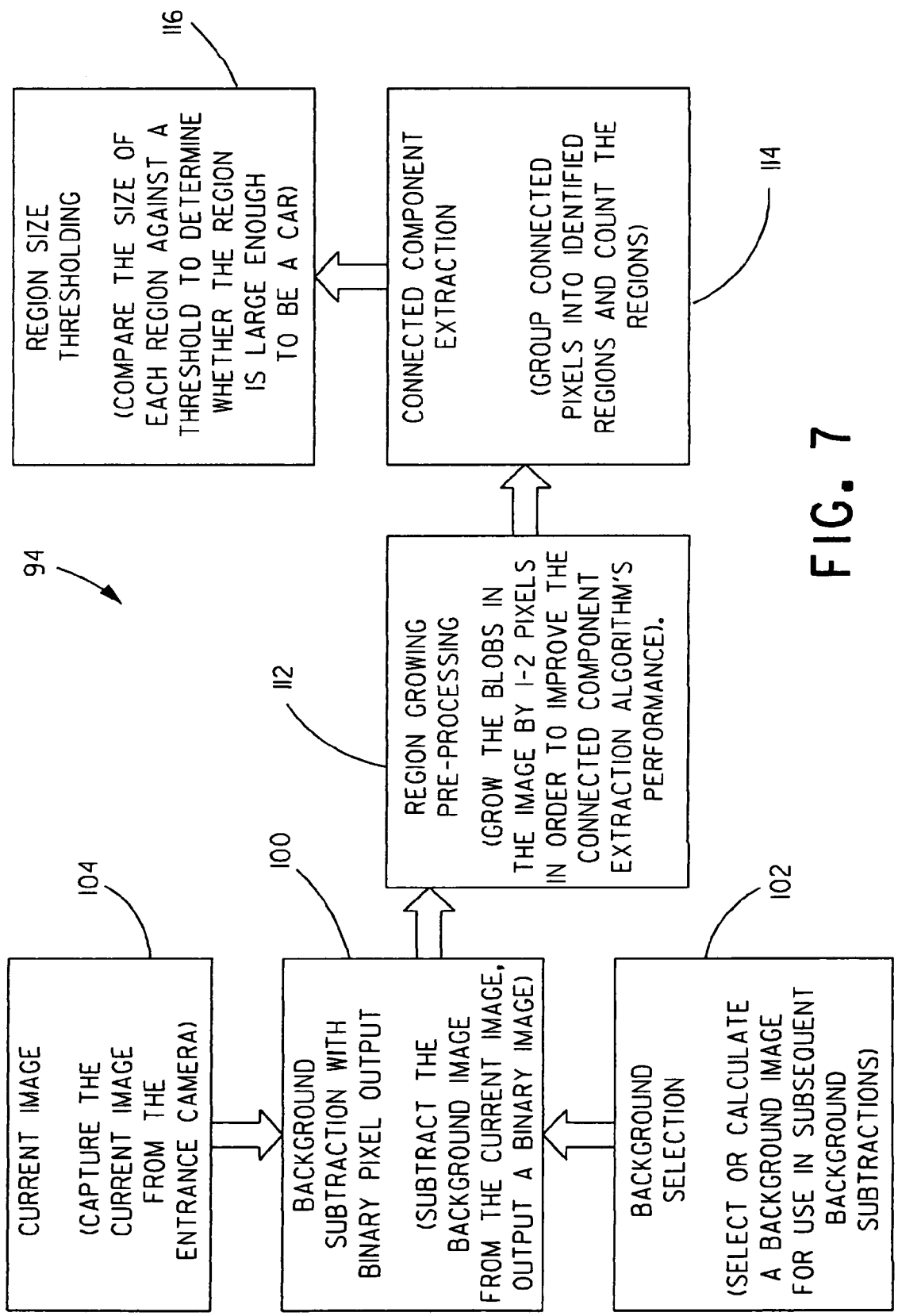
FIG. 7 is a block diagram of an exemplary drive-thru detector architecture.

FIG. 6 illustrates an exemplary architecture for the entrance detector unit 92, and FIG. 7 shows an exemplary architecture for the drive-thru detector unit 94 illustrated in FIG. 5. Image differencing is initially performed as indicated by blocks 100, 102 and 104 in FIGS. 6 and 7.

Arrival Detector Implementation

The detection of arrival of a vehicle (e.g., a car or a pedestrian) may be implemented by analyzing a live stream of images supplied by, for example, an entrance camera, and then signaling a software event when a car has entered the restaurant property. In one embodiment, the overall flow of this analysis is broken down into three major processing steps, labeled $P_n$, as follows: (1) $P_1$: Every image frame is processed to determine whether or not a car, or significant portion of a car, is present in the image. In a preferred embodiment, the image differencing method (described immediately below) is used to implement this $P_1$ processing step. (2) $P_2$: If two consecutive frames are deemed to contain a car, they are compared to determine the direction of motion of the car. The result of this comparison is a "vote" for one of the following four outcomes: (i) "A"—Arrival, i.e., the car is moving in a direction consistent with entering the property. (ii) "D"—Departure. (iii) "S"—Stationary, i.e., the car doesn't appear to move between two successive frames. (iv) "I"—Indeterminate, i.e., in some cases, the image data doesn't allow for a conclusive determination of the car's direction. The implementation of detection of motion or direction of a car in a preferred embodiment is described below. (3) $P_3$: During a sequence of more than two consecutive frames containing a car, the votes generated by $P_2$ for each frame transition are tallied until a frame is found that does not contain a car. At this time, a software event is generated containing the outcome of this voting process. The signaling of a detection event is described below.

Image Differencing—A Processing Method

"Image Differencing" (block 100) is an image processing method that calculates the difference in pixel values between two images. This processing method is useful in the detection of objects such as automobiles and people that are in a fixed field of view. The output of image differencing may be run through a threshold to generate a binary output image. In one embodiment, image differencing is used to process images taken from the restaurant parking lot entrance and exit, and the drive-thru lane, prior to applying algorithms that detect vehicles. An initial image (i.e., a background image 102) is captured from this field of view, which is known to be devoid of objects—in this case, cars and people. Pixels corresponding to a new object that is entering the scene can be detected in the difference image if the object is sufficiently different in appearance from the corresponding region of the reference image. For a large object, such as a car or person, typically a sufficient number of pixels of the object appear in the difference image making it possible to infer the presence of the object by applying simple detection algorithms.

Image differencing calculates, on a pixel-by-pixel basis, the difference (block 100) in pixel intensity between two images: the "current" image 104, which is presumed to contain an object of interest; and the "background" or reference image 102. The intuition of the method is that if the background can be subtracted out of an image, only the object of interest will remain. A limitation of the method may lie in the selection of a reference image that closely correlates to the background contained in the current image. The intuition here is that background pixel intensities are constantly changing as lighting conditions change. In order to properly "subtract out" the background of the current image, a reference image whose pixel intensities are very close to the background in the current image is preferably required.

If the reference image is not closely correlated to the background of the current image, then when the reference image is subtracted from the "current" image, the difference between the pixel intensities of the "reference background" and the "current background" may remain. These background differences are unwanted "background noise", which can obscure the object of interest, making it more difficult for subsequent algorithms to detect the object of interest.

Each of the above described methods and techniques for detecting and tracking vehicles and/or patrons outside a restaurant can also be used with sensors and equipment positioned within a restaurant to detect and track patrons entering or already within the restaurant, as well as determine the time a patron takes while traveling between two or more points (e.g., from the door to the counter, or from the counter to the door, or from the beginning of the counter to the end of the counter) in a restaurant.

In one embodiment, image differencing is used to filter images taken from inside of a restaurant, such as an area in front of or near a sales counter, prior to applying algorithms that detect customers (i.e., people). An initial image is captured from the field of view, which is known to be devoid of customers. Relative to the initial image, an object, such as a customer, creates a change in many pixels in subsequent images, making it fairly straightforward to infer the presence of a person by applying simple detection algorithms to the differenced image.

In a preferred embodiment, the initial image is a color image, and is captured from the field of view which is known to be devoid of customers. Relative to the initial color image, an object, such as a customer, creates a change in many color pixels in subsequent color images, making it fairly straightforward to infer the presence of a person by using the techniques described above. For example, if the distance between each color pixel in subsequent images exceeds a threshold amount, the pixel can be labeled as foreground.

With respect to a color image, in one embodiment, a statistical model of the color distribution of each pixel in the image is learned based on an image sequence without any customers in the field of view. During runtime, the distance between each pixel in the incoming image and the corresponding pixel in the background model is computed. Similar to the above, if the distance between each pixel in subsequent images exceeds a threshold amount, the pixel can be labeled as foreground. In order to suppress noisy pixels (i.e., false positives), connected component analysis with size thresholding is performed on the foreground image.

In one embodiment, a tracking algorithm can be used to identify one or more regions of the input image that belong to the same object (e.g. a person in the restaurant) in an image sequence. To associate image regions across frames a number of cues can be used, including but not limited to, apparent object motion, object color, object feature point locations or object texture. In one particular embodiment, object color is selected due to its simplicity and robustness to occlusion and rotation.

In an embodiment of the present invention, a description of an object is derived by first extracting some or all pixels of the object from the image (e.g. using background subtraction, as described above). In such an embodiment, the individual pixel values can be three dimensional, describing color proportions in, e.g., the red, green and blue color bands. The resulting distribution of pixel values can then be modeled using either parametric (e.g., Gaussians or a mixture of Gaussians) or non-parametric (e.g., histograms or Kernel Densities) methods.

Accordingly, an unknown object (e.g., a person) can then be classified by comparing its color distribution to previously observed distributions. In one embodiment, to increase accuracy the spatial locations of the color pixels can also be modeled in order to distinguish between, e.g., a person wearing black pants and a white shirt from a person wearing white pants and a black shirt. Further, in order to account for appearance changes (e.g. person taking off a jacket, changing illumination conditions) in one embodiment of the present invention, the object representation is continuously or nearly continuously updated. In such an embodiment, proximity cues across image frames along with motion estimation and prediction can be used.

In one embodiment, once the system determines that a new order has been placed by a customer at a counter, the system can use a parametric model (e.g., parametric or non-parametric) of the distribution of clothing colors of the customer standing in front of the register or counter. Using the model, the movement of the customer in front of the counter can be tracked and the time that the customer spends in front of the counter can be calculated using an associated clock, as described in more detail below. In one embodiment, once the customer leaves the field of view of the color vision based sensor, for an extended period of time, including but not limited to 20 seconds, 30 seconds, 40 seconds, 50 seconds, 60 seconds, or more, the transaction for that particular customer can be considered concluded.

Image-Wide Threshold—A Single Car Detector

Certain camera images may have a field of view that is likely to contain only a single vehicle at a time. The entrance and exit camera may be set up to have such a view. Under such conditions, a simple detection algorithm such as an image-wide difference threshold (block 106) may be used to detect the presence of an object large enough to be a car. The image-wide difference threshold method calculates an image-wide value of the differenced image (at block 100) (for example, by summing the absolute value of the image pixels) in order to measure the magnitude of the change between the background image and the current image. If the image-wide intensity difference is large enough (when compared with a predetermined threshold), then it is determined that a fairly large object has moved into the view. The position of the object of interest may be estimated by calculating the center of mass of the object in the differenced image (block 08).

In this method, the differenced image is analyzed to determine whether or not a car is present. The analysis may include the following steps: (a) Every pixel in the difference image may be compared to a threshold value to determine whether the pixel should be labeled as "occluded." The result is an "occlusion map", containing Boolean values (true or false) at each pixel position, indicating whether the corresponding pixel is labeled occluded or not. (b) Each row in the occlusion map may be then analyzed by counting the number of occluded pixels in the row. If this count exceeds a threshold percentage relative to the total number pixels in the row, the row is labeled as "occluded". (c) If the number of occluded rows in the difference image exceeds a threshold percentage relative to the total number of rows in the image, the image is determined to contain an object large enough to represent a car.

Direction or Motion Detection

With respect to FIG. 6, the differenced image may contain one or more "blobs" of pixels (i.e., connected regions of pixels identified as foreground) corresponding to the object of interest (e.g., a car), probably surrounded by spurious pixels (noise). The center of these pixels can be calculated by averaging their row and column values (block 108). Comparing successive images, given a sufficiently fast frame rate, may provide a simple method of determining the direction of the vehicle—which may be useful in determining whether the vehicle is entering or exiting the restaurant's parking lot (block 110).

The motion detection process references the intermediate results of the processing step $P_1$ (discussed hereinabove) for two successive frames containing a car. Let $F_1$ and $F_n$ denote the first and second of such two frames, respectively. In a preferred embodiment, the entrance camera is oriented such that arriving cars move through the image from top to bottom. Image rows are numbered increasing from top to bottom of the image. The motion or direction detection process considers the top-most and bottom-most occluded rows as determined during $P_1$. Let $RT_i$ denote the top-most occluded row of frame $F_j$, while $RB_i$ denote the bottom-most occluded row of frame $F_j$. There are four classification determinations: (1) If $RT_n-1<RT_n$ AND $RB_n-1<RB_n$, the car's motion between frames $F_n-1$ and $F_n$ is classified as "A" for arrival. (2) If $RT_n-1>RT_n$ AND $RB_n-1>RB_n$, the car's motion between frames $F_n-1$ and $F_n$ is classified as "D" for departure. (3) If $RT_n-1=RT_n$ AND $RB_n-1=RB_n$, the car's motion between frames $F_n-1$ and $F_n$ is classified as "S" for stationary. (4) In all other cases, the car's motion between frames $F_n-1$ and $F_n$ is classified as "I" for indeterminate.

Signaling a Detection Event

An "event sequence" may be defined as a series of consecutive frames which contain a car. Thus, an event sequence begins when a frame containing no car is followed by a frame that does contain a car; similarly, the event sequence ends when a frame containing a car is followed by a frame not containing a car. All frames in between these two endpoints are considered part of the event sequence. Every consecutive pair of frames in the event sequence is analyzed by processing step $P_2$ (discussed hereinabove) to determine its direction of motion, and the resulting votes are summed for the entire event sequence. At the end of the event sequence, the motion indicator with the highest number of votes may be used to classify the entire event sequence as "A", "D", "S" or "I", and a software event containing this outcome may be generated and broadcast for consumption by other software modules. The vote counters are then reset to zero for the next event sequence.

It is important to note that an image-wide thresholding algorithm may provide evidence that a certain metric of the object matches a known metric of the object class. In other words, this algorithm may say that the object is "large enough to be a car," but may not positively identify the object as a car. This algorithm can be "fooled" into generating a false positive by any other object that is also "large enough to be a car". For example, if a bus unloads a large group of patrons who happened to walk through the field of view, they could be falsely identified as a vehicle because they collectively create enough change in the image to register as "large enough to be a car".

In addition, the image-wide thresholding method may not determine the number of cars, i.e., how many cars are in the field of view. This may cause several problems. For example, two cars may pass through the field of view in opposite directions at roughly the same time. In that event, the thresholding detector will indicate when something is in the field of view that's "large enough to be a car", but will not indicate that two cars are present. Calculations to indicate the direction of the car may also be in error, as the center of the "blobs" will correspond to the average center of the two cars.

Improved Single and Multi Car Detection—Region Segmentation

Region segmentation algorithms can be used to overcome some of the limitations of image-wide thresholding by determining whether the "blob" of pixels in the image represent a collected, compact mass. Spurious noise, and/or a collection of smaller objects (such as a group of people), can fool the image-wide threshold by triggering as many pixels as a car. Region segmentation techniques test whether those pixels are actually connected into a single blob—further evidence that the object in the field of view is a car. In addition, region segmentation identifies spurious events such as multiple cars passing through the field of view together, even when they are passing in opposite directions.

In one embodiment, images taken from several fields of view may contain multiple cars. This is especially important in tracking a drive-thru lane, where the objective is to maintain an accurate count of the number of vehicles in the lane. Differenced images (at block 100) of these views may contain groups of pixels that correspond to the multiple vehicles. Therefore, it may be desirable to segment or group the pixels that comprise a single blob, in order that the number of distinct blobs in the image might be counted. Prior to segmenting, it may be desirable to perform pre-processing of the regions containing images by growing each "blob" for corresponding images by 1-2 pixels in order to improve the Connected Component Extraction algorithm's performance (block 112), as discussed below.

The "Connected Component Extraction" algorithm (block 114) is a well-known computer vision algorithm for labeling sets of pixels that comprise a single blob. The algorithm operates by marking pixels that are "connected" (share a common edge and/or touch corners) with a common label, thereby grouping the connected pixels into identified regions. The output of the algorithm is a list of regions. Each pixel in the image may be marked with exactly one region label, to identify the region to which it belongs. The number of vehicles in an image corresponds to the number of region labels. The location and the direction of each vehicle's motion can now be calculated as in the single car example (blocks 108, 110).

A principal limitation of the region segmentation method arises from the notion of "connection". The algorithm, as discussed before, operates by scanning the image on a pixel-by-pixel basis and labeling connected pixels with the same region label. In practice, image noise can significantly impact the performance of the algorithm by "disconnecting" regions that are actually connected in physical reality. Region growing (mentioned before with reference to block 112) is one method of improving the performance of region segmentation algorithms. Region growing may be most easily applied to binary images by scanning each pixel of the binary image. If the current pixel is occupied, then its neighbors are checked—any unoccupied neighbor is set to an occupied status in the output image. The name "region growing" comes from the observation that the "blob" in the output image generally grows by one pixel around its perimeter.

Regions labeling methods may be improved by applying a threshold (block 116) to the output regions to determine whether the region is (a) too small to correspond to a car, or (b) large enough to correspond to more than one car. Regions that are too small may be eliminated from further consideration. Regions that are large enough to correspond to more than one car can be further processed, or simply noted to correspond to N cars, where N is the ratio of the number of pixels in the region to the number of pixels corresponding to an average car. A ceiling or floor function may be applied to N to generate an integer output.

The accuracy of the 2-D image processing algorithms may be improved by addressing changes in background lighting, which affect the quality of differenced images; and noise in differenced images, which affects the quality of region segmentation algorithms. Background image drift can be managed by updating the reference image to correlate more closely with the "background" contained in the current image. The reference image may be updated on an image-wide, or pixel-by-pixel basis. Careful management of the reference image helps to reduce or eliminate spurious "background noise" that inhibits the performance of subsequent image processing techniques. A straightforward, image-wide method is to regularly select the most recent background image as the new reference image. In this method, the "current" image is differenced from the reference image. If the differenced image is not found to contain an object, then this current image becomes the new reference image. A second, more computationally complex method is to maintain an average pixel value, for each pixel in the image, across the last several images. This method essentially constructs an artificial reference image, rather than selecting a new reference image. Careful selection of the averaging window enables the filter to react to abrupt changes in the background, without creating background image oscillation.

Feature Detection Approach to 2D Image Processing

As discussed above, one approach to 2D image processing is to focus on "region" or "blob" detection, i.e., to look for a group of pixels that is large enough to be a car. An alternative image processing approach may be to look for a set of "features" in the image that may provide evidence of the existence of an automobile or person in the image. Such "feature detection" techniques may operate by matching features in the image to one or more feature models. In the case of an automobile, for example, the "features" might be windshields, wheels, headlights, or other detectable features.

A feature detection method may benefit significantly from the use of "region" or "blob" detection methods as a pre-processing filter. Intuitively, feature detection methods "search" through an image, looking for a correlation with the feature model. The "region" or "blob" detection algorithms can significantly reduce the number of images to be searched—if there isn't anything large enough to be an automobile, it may not be desirable to search that particular image for headlights. If region methods do find something large enough to be an automobile, then the feature search can be focused on the region of interest—significantly improving the computation efficiency of the feature search method. When used in conjunction with region or blob methods, a feature detector may essentially test the hypothesis that the "object large enough to be a car" actually is a car by searching for corroborating evidence—i.e., the existence of headlights, windshields and wheels. Further, when used in conjunction with region or blob methods, a feature detector may be used to test the hypothesis that the "object large enough to be a person" actually is a person by searching for corroborating evidence—i.e., the existence of a head, arms and legs.

Feature detection methods may also be used to differentiate between scenarios that may be ambiguous to region detection methods. For example, a region-based method may not be able to differentiate between a pickup truck pulling a trailer through the drive-thru and two cars following each other through the drive-thru. Both scenes may contain blobs of roughly the same size and distance apart; however, a feature detector may be able to confirm that, in the pickup and trailer scene (for example), the first blob is a vehicle, while the second is not.

Several key "features" may help to positively identify that an object is an automobile. The location and size of these features may also help to classify the vehicle's type—i.e., for example, car vs. minivan vs. truck vs. bus. Some of the features may include: (1) Width—Most vehicles (i.e., vehicles that are more probable to visit a quick-service restaurant) may be considered to have the same general width. (2) Length—Vehicle lengths may vary, but may be considered generally to be between 15 and 22 feet. (3) Glass—Windshields and windows may be found at 3-4 feet above the ground, and generally rectangular in form, and generally wrapped around the vehicle. (4) Wheels—Wheels and tires may be safely assumed to be round with wheel diameters of 13-18 inches. Similarly, several key "features" may help positively identify that an object is a person. Some of the features may include, for example, size, height, and the detectable presence of legs and arms.

Pixels corresponding to key features may be extracted from either an original image or a differenced image. For performance improvement, as mentioned before, the image differencing technique may be used to identify images likely to contain a vehicle—e.g., there is "something large enough to be a car" in the image. In the discussion under this section, the term "original image" means the image that was originally differenced and found to contain an object. The term "differenced image" means the corresponding post-differencing output image.

There may be several edge operators commonly available—the simplest is probably the Sobel operator and the most complex is probably the Canny operator. Edge operators may be chosen by the designer of the buffer manager 18 for a specific restaurant establishment by considering particular performance requirements of the desired application at the restaurant. The output of an edge detector may be an image of edge pixels. These edge pixels may then be examined to determine whether they likely correspond to any particular vehicle features. In this section, it is assumed that an edge operator has been run over both the original and the differenced images.

Running an edge operator over the differenced image may enable the measurement of the basic width and length of the vehicle. This information may help to establish whether the blob (in the differenced image) has the basic dimensions appropriate to a vehicle. The information may further help to establish whether multiple vehicles are present in the image. This technique may be equivalent to measuring the size of the blob, and identifying individual blobs using previously described region-based techniques.

Edge pixels may be grouped into geometric elements, such as lines and circles, using standard 2D image processing techniques such as, for example, the Hough Transform. The Hough Transform works by considering the possible set of lines to which each edge pixel might belong. A matrix of the parameters of all possible lines, called the "accumulator", may be formed. Each edge pixel may then add one vote to the accumulator elements corresponding to lines of which it could be a member. Naturally, the accumulator elements corresponding to lines in the image will receive many more votes—enabling their identification. The Hough Transform may be generalized to other geometric shapes. For example, circle detection may be achieved by using an accumulator that references a circle's parameters (x, y, r) where x and y denote the center of the circle and r is the circle's radius. Techniques other than the Hough Transform may also be used either alone or in combination with other methods for feature matching.

Queuing Models

In one embodiment, the buffer manager 18 design is based upon classical approaches to uncertainty, queuing theory, parameter estimation, and 2D-image processing (computer vision). Uncertainty is modeled by separating the uncertainty of buffer management into two orthogonal uncertainty classes and then addressing each class separately. These two uncertainty classes are: (i) Temporal Uncertainty—The uncertainty of when the consumer order will be placed; and (ii) Product Uncertainty—The uncertainty of what food product the consumer will order.

In one embodiment, temporal uncertainty (estimation of which is discussed in more detail hereinbelow with reference to block 82) may be reduced through direct measurements (i.e., the output generated at block 72 in FIG. 4) of leading demand indicators. A quick-service restaurant's best leading demand indicator is the arrival of a customer on the restaurant's property. Future product orders are highly correlated to customer arrival, with a lag time that is a function of the number of customers already on the property.

To estimate product uncertainty (discussed in more detail later hereinbelow with reference to block 88), in one embodiment, each consumer order is modeled as an independent random event. Each product then has a certain probability, p, of being selected by a consumer during an order. The number of products expected to be consumed by N patrons can be estimated as the summation of the outcomes of N random events.

Temporal and product uncertainty estimates may be combined to determine the expected amount of product to be ordered within certain windows of time. Conceptually, a future time can be assigned to each independent ordering event, based on various measurements of that particular consumer's progress through the restaurant property. The estimate of when a consumer will place an order allows the calculation of the expected demand for food products as a function of time.

In one embodiment, "Queue Theoretic Modeling" techniques are employed to better estimate when an arriving customer will place an order (i.e., estimating order times). A queue theoretic model assumes that patrons arrive at a service location, where they form into a queue and are serviced according to some service rule. As an example, in a typical drive-thru restaurant queue patron vehicles line up in a single, serial queue, where they are serviced according to a "First In, First Serve" rule. The selection of a queuing model may be a trade-off between demand prediction accuracy and computational complexity. The designer of a buffer manager for a specific restaurant may need to compare the queuing behavior of that restaurant against a series of increasingly complex models to determine which model provides sufficient accuracy, given its computational cost, for that particular application. It may be critical to improve the accuracy of the temporal component of the prediction by more accurately modeling the queuing behavior of customers. The following is a series of queuing models listed in order of increasing computational complexity:

(1) Zero Queue Model (block 77)—The zero queue model may assume that each patron arrives at the restaurant and is serviced in constant service time, T. Note that, generally, service times may be replaced by a service time distribution with an average service time. Such technique may be useful in practice, as it can be used to establish "confidence bounds" on minimum and maximum expected service times. The zero queue model essentially assumes that service can be provided in an infinitely parallel manner—in other words, the $i^{th}$ patron's service time is not a function of the number of other patrons that are in the queue. Thus, conceptually, the zero-queue model treats the restaurant property as a black box. If one were to track only when cars entered and exited the restaurant property, and calculate the average time that a car spends on the property, then one would arrive at the average service time for the zero queue model. The model simply ignores the specifics of how customers are served within the restaurant property, forming only a gross estimate of how long such service takes.

(2) Single Queue Model (block 78)—The single queue model assumes that each patron arrives at the restaurant, enters a single queue with a constant or average service time T. Conceptually, this model may be equivalent to a restaurant that provides only drive-thru service—every vehicle enters the same drive-thru line, where the first person in line is serviced.

(3) Single Queue, Multiple Station Model (block 79)—The single queue model can be expanded to multiple service stations, each of which has a service time T. This model may be considered a conceptual expansion of the drive-thru-only restaurant, where service is provided at multiple stations. For example, drive-thru patrons often stop first at an order station, then proceed to a payment window, then proceed to a pick-up window.

(4) Multi Queue Model (block 80)—The multiple queue restaurant service models are multiple, single queue models in parallel. Conceptually, patrons enter the restaurant property and then join one of several possible single queues. The most common example is the choice between joining the drive-thru lane or parking the car and joining the counter queue. Some restaurants also provide parallel counter service, where patrons can join one of several parallel counter queues.

Estimating Ordering Times—Queue Simulation

The computer 20 may combine the visual detection of arriving consumers with a simulation of the restaurant's queue, either in an outdoor "drive thru" setting or indoors, (using, e.g., one or more of the queuing models 77-80) to predict when each consumer will arrive at an order panel (blocks 82, 83).

A queue simulator may maintain a list of the objects (e.g. one or more vehicles or customers) detected by the vision system (i.e., the image processing system 74 operating on the data received from the sensing system 73). Each object in the list may have an associated clock, which maintains the time since that object was first detected. Each queue simulator, regardless of its complexity, may create a new object and add it to the list when the vision system detects a new vehicle or customer entering the restaurant property at the entrance of the restaurant. The queue simulator may classify the state (or status) of each object. There are three possible states: transit-to-queue; in-queue; and served. The first state, "transit-to-queue", denotes an object that is in transit to a queue, but has not yet reached the queue. The second state, "in-queue" indicates that the object has arrived in a queue and is either waiting to be served, or, if it is the first object in the queue, is currently being served. The third state, "served", indicates that the object has been served.

Upon detecting a new object, the computer 20 may add the new object to the object list and start the object's clock. When a pre-set transit-time has elapsed (simulating the amount of time that it takes for a detected object to enter the queue), the object's status may be changed to "in-queue". Once in the queue, the new object advances toward the head of the queue, moving closer each time the object at the head of the queue is served. Once the new object reaches the head of the queue, a new clock may be started. Once a pre-set "service time" elapses, the new object's status is changed to "served".

In the case where an object enters a serial queue with more than one service station, additional states may be added to represent each stage of the serial queue. For example, a three-station queue may require adding states to represent "first-stage-queue", "second-stage-queue", and "third-stage-queue". Service clocks may also be required for each stage. It is observed that when implementing a multi-stage serial queue, one must take care to note the maximum number of objects that each segment of the queue will be allowed to contain. If an object's service is completed at the first service station, it may pass on to the second queue only if there is room. This requires modifying the test for changing state to "if (service-time-has-elapsed) & (room-in-the-next-queue)". Parallel queues may be modeled as independent implementations. However, there may still be a need to decide which of the parallel queues is entered by the object.

Implementation of a Zero Queue Simulator

This simulator models the restaurant as an infinite number of parallel service stations. When an object is detected, a certain amount of time (transit-time) is assumed to elapse before the object reaches one of these service stations. Once at a service station, a certain amount of time (service-time) is assumed to elapse to service the object. A zero-queue simulator may operate under the following state-change rules: (1) When a new object is added to the list: (a) Mark its status "transit-to-queue"; (b) Start the clock; (2) When T=transit-time has elapsed: (a) Change the object's state to "in-queue"; (b) Restart the clock; (3) When T=service-time has elapsed: (a) Change the object's state to "served". A zero-queue simulator may require the estimation of the "transit-to-queue" time and the "service-time" parameters. In practice, however, the division between the "in-transit" and "in-queue" states is arbitrary and can be ignored. Thus, a single service time can be estimated and used to model the average time that elapses from the entrance of a vehicle onto the restaurant property until that same car leaves.

Implementation of a Single Queue Simulator

This simulation models the restaurant as a single drive-thru. Every object detected at the entrance may be assumed to enter a single queue, which advances as the first object in that queue is served. This simulation models single point of service in the queue. A single-queue simulator may operate under the following state-change rules: (1) When a new object is added to the list: (a) Mark its status "transit-to-queue"; (b) Start the clock; (2) When T=transit-time has elapsed: (a) Add the object to the end of a serial queue; (b) Change the object's state to "in-queue"; (3) For the first object in the serial queue: (a) Restart the clock; (b) When T=service-time has elapsed: (i) Change the object's state to "served"; (ii) Remove the object from the queue; (iii) Advance each object in the queue one position. A single-queue simulator may require the estimation of a "transit-to-queue" time and a "service time" parameters for the single service station. An estimate of the "transit-to-queue" time can be formed by measuring the average amount of time required for a car to transit from the entrance detector to the end of the queue. The "service time" can be estimated by measuring the average amount of time elapsed from the moment that a car pulls up to the order panel until the time that it drives away from the present (delivery) window. These service times may or may not be available from the restaurant's ordering system.

Implementation of a Single Queue, Multiple Station Simulator

A single queue, multiple station model expands upon the single queue model by adding additional service points in the queue. The model is essentially a single drive-thru restaurant where service is divided into multiple stations, such as order, payment, and presentation. A single queue, multiple station simulator may operate under the following state-change rules: (1) When a new object is added to the list: (a) Mark its status "transit-to-queue"; (b) Start the clock; (2) When T=transit-time has elapsed: (a) Add the object to the end of a serial queue; (b) Change the object's state to "in-queue"; (3) For the first object in the serial queue: (a) Restart the clock; (b) When T=service-time has elapsed: (i) If there is a next queue and room in the next queue: (A) Change the object's state to "next-queue"; (B) Move the object to the end of the "next-queue"; (C) Advance each object in the queue one position; (ii) If this was the last queue, then: (A) Change the object's state to "served"; (B) Remove the object from the queue; (C) Advance each object in the queue one position. A single queue, multiple station simulator may require the same same transit-time estimator as the single queue simulator. It differs from the previous model in that it requires the estimation of multiple service times, one for each station in the queue. The estimation methods are essentially the same as in the single queue model.

Implementation of a Multi Queue Simulator [0135] As discussed before, a multiple queue model is treated as multiple, single queue models in parallel. Hence, a multi queue simulator may be implemented as multiple single queue simulators discussed hereinabove. Hence, no additional discussion of a multi queue simulator is provided herein.

Adding Drive-Thru Vehicle Detection

As described hereinbefore, 2-D image processing technique may be used to count multiple vehicles in a single image. This technique can be applied to a field of view that contains the drive-thru lane and used to count the number of vehicles in the drive-thru. Such a technique may also enable the system to reason about expected counter traffic.

A direct measurement of the drive-thru queue can replace the need for a drive-thru queue simulator to model traffic flow through the drive-thru lane—assuming that the implementation of the vision processing system provides sufficiently accurate data. In one embodiment, the use of a drive-thru measurement system is envisioned primarily as a means of augmenting and not replacing the entrance detector. The use of a drive-thru measurement system alone may not provide the computer 20 with an accurate estimate of the total demand that the restaurant expects to see in the next few minutes, as it may not have any means of detecting the number of vehicles that have entered the property, but have not entered the drive-thru line.

In certain applications, where the drive-thru comprises a very large percentage of the restaurant's business, the solo use of a drive-thru measurement system may prove sufficiently accurate. For these applications, a "safety factor" may be introduced to account for the undetected entrance traffic. Such implementations should be cautiously tested to ensure that they truly provide sufficient buffer management accuracy.

A direct measurement of the drive-thru queue, together with an accurate count of the number of vehicles that have recently entered the restaurant's property, may make it possible to determine the number of vehicles that have been parked. Patrons of parked vehicles usually become counter traffic, enabling the system to form an estimate of the arrival of new counter traffic that is substantially proportional to the number of newly parked cars. A counter queue may be modeled simply as a single serial queue or a set of parallel queues, as appropriate to the actual ordering configuration of the restaurant front counter area 32 (FIG. 3).

Implementation of a Simulator with Drive-Thru Visual Detection

Drive-thru visual detection may significantly reduce the uncertainty associated with the internal flow of consumer traffic. The actual state of the drive-thru can be measured at a high enough rate to virtually eliminate uncertainty about the number of vehicles in the drive-thru and the average service time for the queue. The queue simulator may be split into a drive-thru model and a counter model. Direct visual monitoring of the drive-thru lane enables the employment of the simple, single queue model without the need for multiple service stations, as discussed below. The counter queue may be modeled as a single queue, or a set of parallel queues, depending upon the actual configuration of the counter service area as noted before.

Direct visual measurements may enable the drive-thru simulator to operate under some simple state change rules: (1) For each object detected at the entrance: (a) Create a new object; (b) Assign that object the status "in-transit"; (c) If an object enters the tail of the drive thru queue within some "maximum-transit-time" then: (i) Change the object's status to "drive-thru-queue"; (ii) Add the object to the drive-thru queue list; (iii) Assign the object a position number—e.g., $i^{th}$ object in the queue; (d) Otherwise, assume that the object has parked: (i) Change the object's status to "parked"; (ii) Add N persons to the counter traffic queue; (2) For each object in the drive-thru queue: (a) Visually monitor the queue; (b) For the first object in the queue: (i) Start a clock when it becomes the first object; (c) When the first object in the queue moves past the ordering panel: (i) Stop the first object's clock; (A) Report the elapsed time to the average service time estimator; (ii) Update each object's position in the queue; (iii) Change the first object's status to "served".

A counter queue simulator may be implemented as either a single service queue, or multiple parallel service queues, depending upon the physical service layout in that particular restaurant. It is observed that many restaurants force their patrons to queue-up in a single line, using railings or other barriers to denote the queue path. Other restaurants may have multiple ordering stations, allowing patrons to line up behind 2-3 different queues. A counter queue simulator's state change rules may be identical to those of a single queue. Where parallel queues are used, the simulator may assign each incoming patron to one of the parallel queues. In one embodiment, incidences of queue shifting are ignored.

The employment of visual monitoring of the drive-thru lane may significantly reduce the uncertainty of the queue simulation by reducing the amount of traffic whose progress through the restaurant service process is simulated. With drive-thru traffic comprising 40%-60% of an average restaurant's daily business, this may result in significant reduction in prediction error. However, one must realize that the underlying assumption in employing this method is that visual monitoring is more accurate than the drive-thru simulation. Therefore, one must ensure that this is indeed the case. Further, an implicit assumption is made in visual monitoring that all traffic that does not enter the drive thru must have parked and become counter traffic. This may be unlikely to be true—at least some traffic may pass through, may be employees, or may not become counter traffic for some other reason. This assumption may be softened by introducing a proportionality constant—and, in fact, this implicitly happens, as such a constant is "folded in" to the consumer to parked car ratio previously discussed.

Extension to Enable Detection of Parked Cars

The accuracy of the buffer manager 18 may be further improved by taking direct visual measurements of a restaurant's parking area in order to determine exactly how many cars have parked. Simple extensions to the image processing algorithms previously described enable the system to determine whether a vehicle has parked. Parked cars occupy regions of the parking lot that are known a priori and cars stay there for a fairly long period of time. The detection of parked cars may be accomplished using substantially the same 2-D image processing methods previously described for tracking a drive-thru lane. Extensions to the image processing methods may be required to calculate the positions of the identified regions and determine whether they presently occupy a "parking space". The positions of the identified regions can be reported either in the image space (column, row), or transformed into a coordinate system in the restaurant's frame of reference. In a preferred embodiment, the camera used to localize the object remains fixed in the restaurant's frame of reference-therefore transformation into a second coordinate system may not be necessary so long as the "parking spaces" can be transformed into the image space.

Occlusion may be a particular concern because the buffer manager 18 may need to distinguish between the occupancy of a parking space with occlusion of a parking space. There are two general approaches to distinguishing between occupancy and occlusion. The first method is to add a second sensor whose field of view removes the ambiguity—i.e., the second sensor can see the object from another point of view, enabling a 3D localization. The second method is to selectively place the original sensor such that occlusions are minimized, and use a set of heuristics to "confirm" that the object is occupying the space. Such heuristics may include measuring the median axes of the object to see if the long axis aligns with the parking space.

Visual detection of parked cars may improve the accuracy of the estimates of the counter queue arrivals by more accurately measuring the time at which a car parks. This method may still require the assumption that a certain number of consumers enter the counter queue per car, thus no improvement in the actual consumer count may be made. As discussed before with reference to the state change rules for a single queue model, the single queue simulator created an object upon its detection at the entrance, and then assumed that the object spent some amount of time "in-transit". The application of this queuing method to the counter queue may require estimating the "in-transit" time to include the time to park the car, the time to get out of the vehicle, the time to walk across the parking lot, and the time to enter a queue. Visual detection of parked cars may improve the accuracy of the simulator by actually measuring the first part of the "in-transit" time—the time to park the car.

Detecting People

The accuracy of a queue simulator may benefit from the visual detection of people, either as they exit their parked cars, as they enter the restaurant, or as they travel through the restaurant e.g., entering through a door, approaching a sales counter, progressing to the sales counter, departing from the sales counter, and/or subsequently exiting the restaurant. In one embodiment, the same cameras that provide images of the parking lot, also capture images of patrons as they exit their vehicles. Additional cameras can be placed such that they capture views of the entrance doors at the restaurant. The addition of entrance door cameras may provide higher accuracy patron count, as the field of view can be narrowed such that a person subsumes a larger number of pixels than is possible with a parking lot camera. As described in more detail above, the detection of a person may be accomplished in substantially the same manner as the detection of vehicles in the drive-thru—e.g., using image differencing, followed, for example, by region segmentation (as discussed hereinbefore with reference to FIG. 7).

The detection method may be applied to images of a parking lot in the case where the detection of persons exiting their vehicles is desired. The structure of the problem enables the detector to narrow its search for new, emerging blobs that may appear to the right and left of the long axis of the vehicle as the vehicle's doors open. This change in the shape of the vehicle is the first evidence that a person will most probably emerge from the vehicle. Detection of an opening door may be performed by comparing iterative "blobs" and looking for the emergence of additional pixels in the appropriate place. Following the detection of the opening of the door, the buffer manager 18 may track that side of the vehicle (i.e., the side of the vehicle containing the opened door), toward the rear of the vehicle, for smaller blobs (i.e., smaller than the cars) that may emerge from the parking zone, cross the parking lot, and head toward an entrance of the restaurant. Following region segmentation, the height and aspect ratio of blobs detected in the appropriate sections of the image may be compared to determine if they are the correct height and shape for a human. These metrics may further provide evidence as to whether the blob may be an adult or a child.

The same method may also be employed to use a camera specifically aligned with the entrance doorway. The addition of a sensor that indicates when the door has been opened (such as a broken circuit) can provide separate evidence that patron(s) may be entering. It is observed that the application of the method discussed hereinabove to parking lot images versus doorway entrance images may be a trade-off between look-ahead and accuracy. The detection and count of patrons in the parking lot may provide the restaurant kitchen with more warning that consumers are approaching. The detection and count of patrons at the entrance doorway may be more accurate—especially if one attempts to classify patrons into classes such as "adult" versus "child"—simply because a closer image will provide the vision algorithms with more pixels to work with. The visual detection of people entering a restaurant (whether detected exiting a car, or entering the doorway) may provide an explicit count for the counter queue. This explicit count may be more accurate than an estimate based solely on the number of cars that park in the restaurant's parking lot.

Human Patron Detection and Tracking

As noted above, image differencing can be used to process images taken from inside of a restaurant, such as an area in front of or near a sales counter. An initial image is captured from the field of view, which is known to be devoid of customers. Relative to the initial image, an object, such as a customer, creates a change in many pixels in subsequent images, making it fairly straightforward to infer the presence of a person by applying simple detection algorithms to the differenced image. Further, the images of a customer can be used to discern the time a customer takes to move between two or more points (e.g., from the door to the sales counter, or from the sales counter to the door, or from the beginning of the sales counter to the end of the sales counter) in the restaurant.

In one embodiment, a captured image can be a pixilated image. In yet another embodiment, the image can be a black and white or high contrast image. In yet another embodiment, a captured image can be a color image, and the image can be captured using a color-enabled camera.

In one embodiment, as described briefly above, one or more color enabled cameras can be used to capture a color image, provide an explicit customer count, time of duration a customer is on the restaurant property, and provide a direction of movement estimate of people entering and/or already present in a restaurant. Similar to the above description with respect to drive through services, any of the queuing models set forth herein can be applied to patrons entering and moving about (e.g., in a queue at a sales counter at a restaurant. In a preferred embodiment, a color based vision system associates one or more colors and/or a color distribution to an object to assist in tracking the object while the object is on the property.

In one embodiment, the computer 20 may optionally combine the color visual detection of arriving consumers with a simulation of the restaurant's queue, (using, e.g., one or more of the queuing models 77-80) to predict when each consumer will arrive at a location of placing an order (e.g., an order panel (blocks 82, 83)).

A queue simulator may maintain a list of the objects (e.g. one or more customers) detected by the color vision based system (i.e., the image processing system 74 operating on the data received from the sensing system 73). Each object in the list may have an associated clock, which maintains the time since that object was first detected. An advantage of using a color vision based system is that the objects can be more readily differentiated from other objects, and in particular patrons, which can be particularly useful in crowded restaurants. Such differentiation can reduce the likelihood of timing errors which can occur when the system fails to differentiate between objects. Specifically, the color vision based system enables enhanced differentiation between multiple objects in a restaurant, e.g., a blue blob and a red blob versus two blobs, described above.

Figure 9:
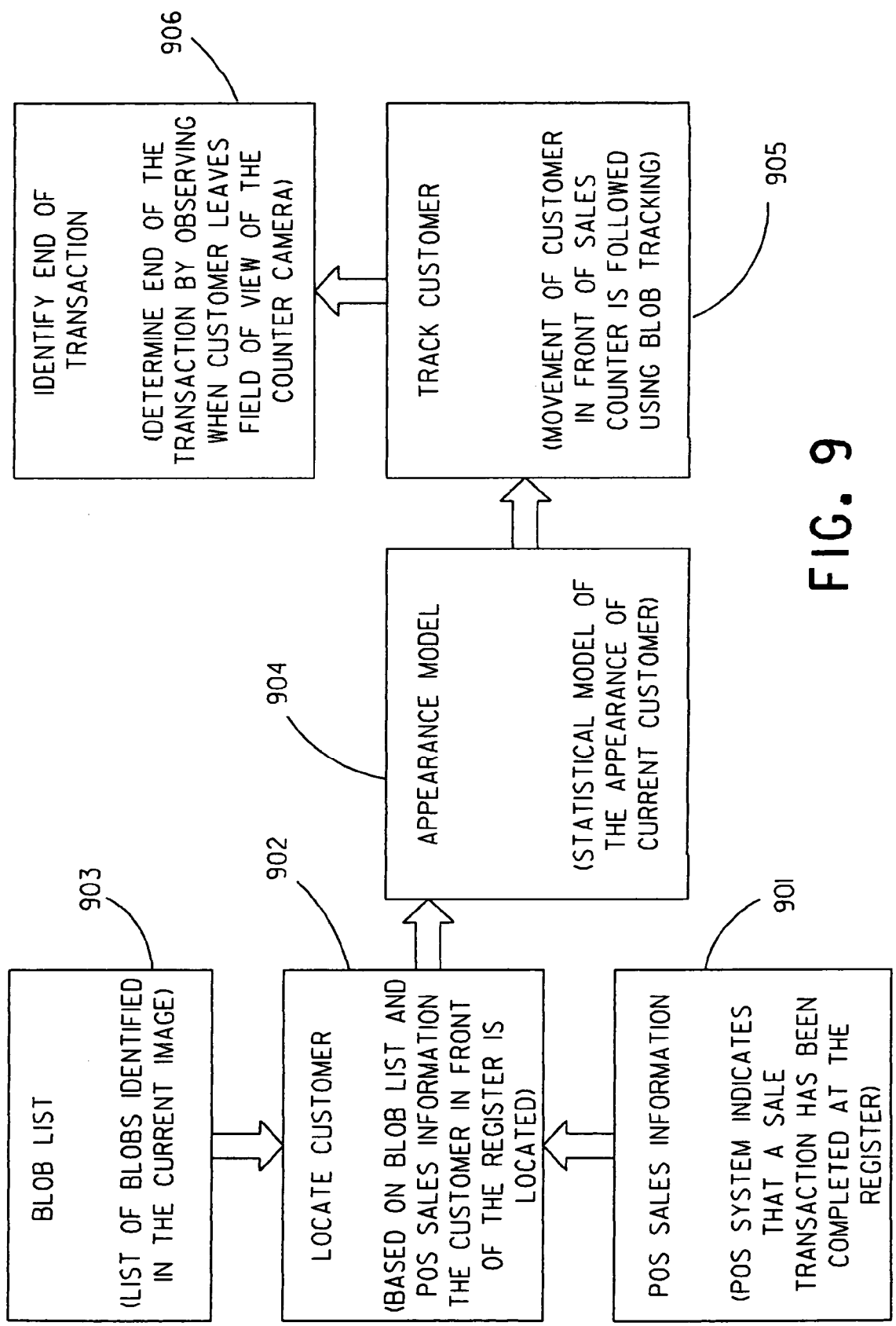
FIG. 9 is a block diagram of an object detection and transaction algorithm.

As shown in FIG. 9, and with reference to the spatial configuration of sensors 42, 44, 46 and 48 as described above and set forth in FIG. 3, once the point of sale system signals a completed sales transaction (block 901) the customer in front of the counter is located (block 902) using the current list of detected image blobs (block 903). A model of the appearance of the customer in the image is then generated using, e.g. color information (block 903). Using the appearance model the movement of the customer in front of the sales counter is tracked (block 905). Observing when the customer leaves the field of view of the counter camera(s) (block 906) identifies the end of the transaction.

Accordingly, each queue simulator, regardless of its complexity, may create a new object and add it to the list when the color based vision system detects a new customer entering the restaurant property or restaurant, e.g., at the entrance of the restaurant. The queue simulator may classify the state (or status) of each object and one or more colors associated with the object. As described above, there are three possible states: transit-to-queue; in-queue; and served. The first state, "transit-to-queue", denotes an object that is in transit to a queue in the restaurant, but has not yet reached the queue. The second state, "in-queue" indicates that the object has arrived in a queue and is either waiting to be served, or, if it is the first object in the queue, is currently being served. The third state, "served", indicates that the object has been served.

Upon detecting a new object, the computer 20 may add the new object to the object list and start the object's clock. When a pre-set transit-time has elapsed (simulating the amount of time that it takes for a detected object to enter the queue), the object's status may be changed to "in-queue". Once in the queue, the new object advances toward the head of the queue, moving closer each time the object at the head of the queue is served. Once the new object reaches the head of the queue, a new clock may be started. Once a pre-set "service time" elapses, the new object's status is changed to "served".

However, because objects in a queue can be positioned close together it is possible for the queue simulator to lose track of one or more customers, particularly in a non-color based vision system. Specifically, if two objects remain close together, the algorithms used to detect objects may not be able to differentiate between the objects and therefore one or more objects (and the objects' associated clocks) may be dropped from the simulated queue by the algorithm because the algorithm may inadvertently "merge" the two objects into one.

This "object drop" or "object merge" problem can be significantly reduced through the use of a color vision based system because the associated clock is attached to an object having a particular color, thereby reducing the possibility that one or more objects in a queue will be inadvertently dropped or merged. Specifically, the associated algorithms do not permit the merging of different colors. In such systems, it is preferred that the color resolution be sufficient to distinguish between three or more colors, thereby reducing the likelihood of "object merging" or "object dropping" and increasing the accuracy of the predictive models described herein. An additional benefit of color based vision sensors occurs when an object moves from the field of view and returns a short time later. By comparing one or more associated colors and/or color distribution of an object that recently left the field of view (i.e., within 20 seconds to 60 seconds, as described above) of the color based vision sensor, with one or more colors and/or color distribution of an object that has returned into the field of view, the system can more accurately determine if a transaction is complete. Specifically, if the system determines that a customer has left the field of view of the sensor, but returned a short time later, the clock associated with the customer can be re-started and continue until the customer completes the transaction. In some embodiments, the transaction can be considered complete after the object has been removed from the field of view of the color based vision sensor for a period of greater than 20 seconds, 30 seconds, 40 seconds, 50 seconds, 60 seconds, or more.

In the case where an object having an one or more associated colors or a color distribution enters a serial queue with more than one service station, additional states may be added to represent each stage of the serial queue. For example, a three-station queue may require adding states to represent "first-stage-queue", "second-stage-queue", and "third-stage-queue". Separate service clocks may also be required for each stage. As noted above, it is observed that when implementing a multi-stage serial queue, one must take care to note the maximum number of objects that each segment of the queue will be allowed to contain. If an object's service is completed at the first service station, it may pass on to the second queue only if there is room. This requires modifying the test for changing state to "if (service-time-has-elapsed) & (room-in-the-next-queue)". Parallel queues may be modeled as independent implementations. However, there may still be a need to decide which of the parallel queues is entered by the object.

In one embodiment of the present invention, a vision based system of the present invention can be operated in parallel with a queuing simulator in order to reduce the need to explicitly track every patron through the entire or a portion of the queue.

Figure 10:
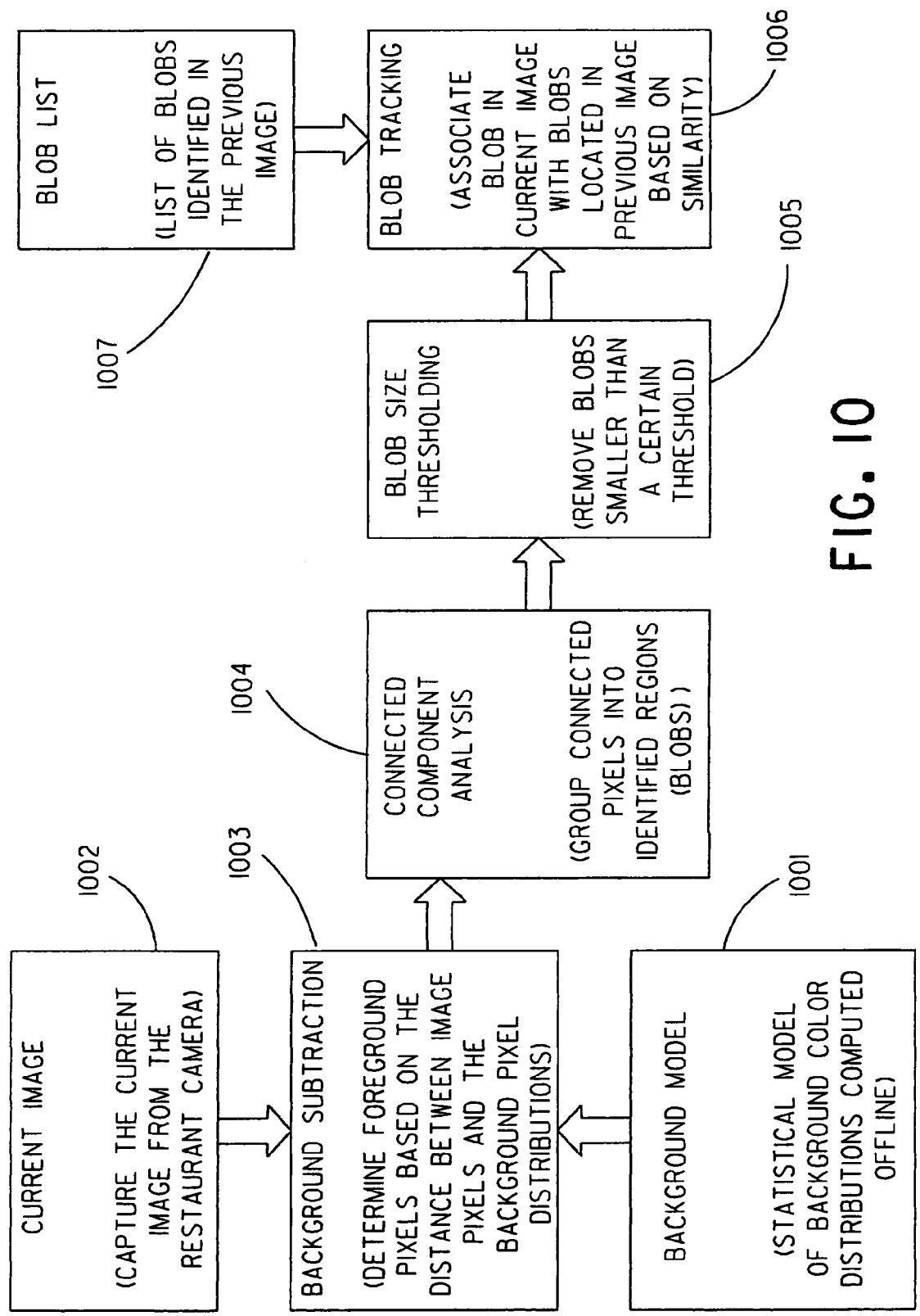
FIG. 10 is a block diagram of an object tracking algorithm.

As shown in FIG. 10, and with reference to the spatial configuration of sensors 42, 44, 46 and 48 as described above and set forth in FIG. 3, in one embodiment of the invention a statistical model of the distribution of pixel intensities and colors is created from a sequence of images known to be devoid of foreground objects (block 1001). Foreground regions are then identified in the current image (block 1002) by computing the distance between the pixels in the current image and the corresponding model information in the background model (block 1003). In order to suppress spurious detections, foreground pixels are grouped into connected regions (blobs) using Connected Component Analysis (block 1004). Since the geometry of the restaurant and approximate heights of customers in the image are known, small blobs can be removed (block 1005). The resulting list of blobs of the current image is then compared to the list of blobs from the previous image (block 1007) to identify blobs corresponding to the same object in the scene (block 1006) using e.g., appearance and distance information.

Implementation of a Zero Queue Simulator

As described above, this simulator models the restaurant as an infinite number of parallel service stations. When an object having one or more associated colors and/or an associated color distribution is detected, a certain amount of time (transit-time) is assumed to elapse before the object reaches one of these service stations. Once at a service station, a certain amount of time (service-time) is assumed to elapse to service the object. A zero-queue simulator may operate under the following state-change rules: (1) When a new object is added to the list: (a) Mark its status "transit-to-queue"; (b) Start the clock; (2) When T=transit-time has elapsed: (a) Change the object's state to "in-queue"; (b) Restart the clock; (3) When T=service-time has elapsed: (a) Change the object's state to "served". A zero-queue simulator may require the estimation of the "transit-to-queue" time and the "service-time" parameters. In practice, however, the division between the "in-transit" and "in-queue" states is arbitrary and can be ignored. Thus, a single service time can be estimated and used to model the average time that elapses from the entrance of a person into the restaurant property until that same person exits the queue and/or restaurant.

Implementation of a Single Queue Simulator

This simulation models the restaurant as a single walk up line. Every object having one or more associated colors and/or an associated color distribution detected at the entrance may be assumed to enter a single queue, which advances as the first object in that queue is served. This simulation models single point of service in the queue. A single-queue simulator may operate under the following state-change rules: (1) When a new object is added to the list: (a) Mark its status "transit-to-queue"; (b) Start the clock; (2) When T=transit-time has elapsed: (a) Add the object to the end of a serial queue; (b) Change the object's state to "in-queue"; (3) For the first object in the serial queue: (a) Restart the clock; (b) When T=service-time has elapsed: (i) Change the object's state to "served"; (ii) Remove the object from the queue; and (iii) Advance each object in the queue one position. A single-queue simulator may require the estimation of a "transit-to-queue" time and a "service time" parameters for the single service station. An estimate of the "transit-to-queue" time can be formed by measuring the average amount of time required for a person to transit from the entrance detector to the end of the queue. The "service time" can be estimated by measuring the average amount of time elapsed from the moment that a person approaches a service station, sales counter, or order panel until the time that person walks away from the service station, sales counter, or order panel. In one embodiment, it can be assumed that after a person approaches a service station and then walks away, the customer has received his/her order and the transaction is complete. These service times may or may not be available from the restaurant's ordering system.

Implementation of a Single Queue Multiple Station Simulator

A single queue, multiple station model expands upon the single queue model by adding additional service points in the queue. The model is essentially a single walkup restaurant where service is divided into multiple stations, such as order, payment, and presentation. A single queue, multiple station simulator may operate under the following state-change rules: (1) When a new object having one or more associated colors and/or an associated color distribution is added to the list: (a) Mark its status "transit-to-queue"; (b) Start the clock; (2) When T=transit-time has elapsed: (a) Add the object to the end of a serial queue; (b) Change the object's state to "in-queue"; (3) For the first object in the serial queue: (a) Restart the clock; (b) When T=service-time has elapsed: (i) If there is a next queue and room in the next queue: (A) Change the object's state to "next-queue"; (B) Move the object to the end of the "next-queue"; (C) Advance each object in the queue one position; (ii) If this was the last queue, then: (A) Change the object's state to "served"; (B) Remove the object from the queue; (C) Advance each object in the queue one position. A single queue, multiple station simulator may require the same transit-time estimator as the single queue simulator. It differs from the previous model in that it requires the estimation of multiple service times, one for each station in the queue. The estimation methods are essentially the same as in the single queue model.

Implementation of a Multi Queue Simulator

As discussed before, a multiple queue model is treated as multiple, single queue models in parallel. Hence, a multi queue simulator may be implemented as multiple single queue simulators discussed hereinabove.

Furthermore, a color based vision system of the present invention can provide enhanced accuracy by applying algorithms that account for objects that change colors (e.g., a patron takes off a jacket and has a different color shirt on underneath) during tracking. In one embodiment, in order to account for appearance changes, (e.g., a person taking off a jacket or changing illumination conditions) the object representation has to be continuously updated. Here proximity cues across image frames along with motion estimation and prediction are typically used. If the algorithms indicate that the only color change involves the object in the vicinity of where the first object originally was, the algorithms can then apply the first object's associated clock to the changed color object.

Additionally, a color distribution associated with each object and/or a color associated with each object may be one or more colors that predominate the color scheme of the object (e.g., the color of a patron's shirt or the colors of the patron's shirt and pants), as described above. However, in order to facilitate the differentiation between objects in a field of view of a color based vision sensor, the algorithms may assign a color to an object. Accordingly, in such an embodiment, an object may in fact be "yellow" in appearance but have an assigned color "red." Such an embodiment further reduces the incidence of "object merging" and "object dropping" because each object in or around the restaurant can have an assigned color which is different from all or most other colors in the field of view of the color based vision sensor. The color assigned to an object can be from a predetermined list (e.g., in order red, orange, yellow, green, blue, indigo, violet) that can then be repeated as many times as necessary, or the colors can be randomly assigned.

It should also be noted that the color based vision system of the present invention can not only be used to track mobile objects (e.g., people) within a restaurant, but can also be used external to the restaurant to monitor traffic patterns of humans and automobiles outside the restaurant. Accordingly, the advantages associated with using an interior positioned color based vision sensor can apply equally to an externally located vision based sensor. Also, one or more color based vision sensors can be used alone or in combination with other sensor types described herein.

Estimating Impending Production Demand

After modeling temporal uncertainty (at block 82 in FIG. 4) to determine the timing of consumer orders, the computer 20 may next estimate impending production demand (block 84) using a probabilistic model to calculate the expected number of food products and food product components the restaurant's kitchen should prepare in order to meet the impending demand generated by arriving customers. The probabilistic model may take as input N, the number of patrons expected to arrive at an ordering panel within the time period T (as determined at block 82). Alternately, the probabilistic model may take as input N(t)—the time-dependent version of the time-invariant input N—indicating the number of patrons expected to arrive at the ordering panel at time "t" (i.e., a particular instant of time as distinguished from an interval of time given by "T").

The computer 20 may use queue simulation to make a series of production decisions in real time. Some typical questions that a human restaurant manager may periodically consider in order to manage buffer levels are: (1) How many bins of components should the kitchen crew generally keep in the buffer? (2) How much longer is the current bin level likely to last? (3) When will the kitchen likely need to start cooking more food product components? (4) Can I confidently order any completed products to be made ahead of time?

The computer 20 may estimate impending production demand by estimating desired nominal component buffer level (block 85), estimating remaining time per bin (block 86), and estimating optimal preparation times (block 87) as discussed below.

Estimating Desired Nominal Component Buffer Level (Block 85)

A "nominal" buffer level may be defined as the number of bins of food components (e.g., burger patties and buns for a completed burger product) that a human restaurant manager may order the kitchen staff to maintain. In a restaurant with a grill, a grill cook can easily regulate the buffer at a certain number of bins or patties. This method of buffer management is traditionally one of the most common because it is so easy for the crew to accurately carry out. A human manager can simply tell the grill cook to maintain 3-4 bins of meat throughout lunch and feel confident that that level of food product will be available. In one embodiment, the computer 20 of buffer manager 18 according to the present invention determines the nominal buffer level using a patty count instead of a bin count.

The computer 20 of buffer manager 18 according to the present invention improves upon this practice by electronically calculating a "nominal" buffer level that is proportional to the actual number of patrons on the restaurant's property. The computer 20 attempts to change the "nominal" buffer level such that both over and under production are avoided. Nominal component buffer levels may be calculated based on the number of patrons, N, on the restaurant property who have not yet placed an order. As described hereinbefore, several vision-based methods of estimating the number of patrons on the restaurant's property include counting cars at the restaurant's entrance, counting cars at the drive-thru, counting parked cars, and counting restaurant patrons. From these several methods, an estimate of N may be formed. The nominal buffer level for each food product component is proportional to N. The proportionality constant for each food product component may be termed the "expected value"—referring to the expected number of food product components that each patron is expected to consume, on average. Estimation of the "expected value" may be considered a part of the product uncertainty modeling (discussed later hereinbelow with reference to block 88 in FIG. 4).

Estimation of desired nominal component buffer level may bound production by the total number of unplaced orders on the restaurant property. Where historical data methods may actually call for production during periods where there are absolutely no potential consumers on the property, the estimation performed by the computer 20 would call for a bin level of zero. Where historical data methods may call for low production during a period when 20 cars show up, the computer 20 would instruct the kitchen crew to drive production higher, in proportion to the newly arrived demand. Thus, this method of estimating desired nominal component buffer level according to the present invention may drive production in proportion to current demand. Subsequent methods may work to improve the convergence of this method's demand-curve following performance.

The method that estimates the nominal component buffer level may be a strict proportional controller that commands a buffer level proportional to the total number of unplaced orders on the restaurant property. This method may not take time into account. Thus, product freshness may not be represented in the calculation of production commands, nor may the minimum time requirements of production be considered. These limitations may cause the computer 20 to order production that produces product unnecessarily soon, or it may allow bin levels or patty counts to drop so low that the kitchen staff could not adequately prepare product fast enough to serve the next arriving set of consumers. In other words, the above-described method of estimating nominal component buffer level may not consider the impact on freshness or the need for safety margins.

Estimating Remaining Time Per Bin (Block 86)

Each bin of food product components may last a certain amount of time, dependent upon the rate of arrival of new consumers. Thus, it may be desirable to estimate the remaining time for a bin of food product components so as to decide when to begin cooking another bin of food product components. If there isn't enough demand to consume the remaining bins, then the restaurant shouldn't prepare additional food product. If there is enough demand to consume the remaining bins, then the kitchen may wish to wait to prepare the new food product components "just in time" in order to maximize its freshness.

Food quality is a significant driver of repeat sales for the quick-service industry. Food quality generally refers to the temperature, moisture, and texture of the meat patties, French fries, fried patties, and other heated food product components. Freshly prepared food product meets the highest quality standards for temperature, moisture, texture, etc. because the food preparation equipment (grills, fryers, etc.) is tuned to generate optimal food product. Food product quality thus deteriorates as a function of time as food sits in holding bins waiting to be served.

When an estimate of the number of patties (an example of a food product component) remaining in the buffer is available (using the method described hereinbelow with reference to block 88 in FIG. 4), the remaining time per bin may be estimated as follows: (1) Calculate the number of patrons, P that can be served, given the number of patties currently contained in a bin. (2) Obtain an estimate of the number of patrons on the property P*. (3) If P<P*, then no additional patties are required: (a) Remaining time per bin is not defined. (4) If P>P*, then: (a) Using the relevant queue simulator model, walk backwards through the queue to the Pth patron; (b) Record the estimated time of arrival (ETA) for the Pth patron; (c) The ETA of the Pth patron is the estimated remaining time for the bin.

The method described hereinabove may be extended to multiple bins. Most buffer systems contain multiple warming bins, therefore it is desirable to extend the method to calculate the remaining time per bin for each bin. The bins are assumed to be labeled i=(1,2, ... N) in order of their production—bin 1 was made first, followed by bin 2, etc., through bin N. The extended method can be given as: (1) Calculate the total number of patrons $P_i$ that can be served, given the number of patties in the $i^{th}$ bin; (2) Obtain an estimate of the total number of patrons on the property, P*; (3) For each bin: (a) If sum[$P_0$ ... $P_i$]<P*, then (i) The remaining bin time for the $i^{th}$ bin is undefined; (b) If sum[$P_0$ ... $P_i$]>P*, then (i) Using the relevant queue simulator model, walk backward through the queue to the $P_i^{th}$ patron; (ii) Record the estimated time of arrival of the $P_i^{th}$ patron; (iii) The ETA of the $P_i^{th}$ patron is the estimated remaining time for the $i^{th}$ bin.

In one embodiment, the present invention provides a means of measuring the quality of served food product by tracking the amount of time that that product spent in the holding bin prior to being served.

In one embodiment, the present invention measures holding times by logging the time at which the food product was produced, as noted when the employee enters production data onto the touch screen monitor, and later by noting the time at which a sale is rung up and subtracting the difference. Accuracy of the hold time estimate can be improved by noting that the food product may sit a little longer until the employee responds to the sale and makes and serves the actual food product.

The present invention can provide an advantage because the ability to measure and/or estimate the quality of every single food product on an individual basis provides the restaurant with a strategic competitive advantage, as the restaurant management can continually monitor their quality and make appropriate operational adjustments to strategically adjust quality standards.

Estimating Optimal Preparation Times (Block 87)

The previously described method of calculating the "nominal" bin levels (at block 85) may not explicitly calculate when another bin of food product components should be prepared. The method at block 85 may be used to regulate buffer levels by displaying the nominal bin level to the kitchen crew and relying upon them to judge when to prepare a product. Alternatively, the computer 20 may estimate optimal preparation times for the kitchen crew by continually reviewing the component reserve held in a buffer with the current demand detected on the restaurant's property. Moreover, the queue simulators (discussed hereinbefore) may provide a good estimate of the rate at which that demand will place future orders. This information may collectively enable the computer 20 to calculate optimal preparation times, given an estimate of the production time required to prepare another bin of food product.

A method for determining the "nominal" bin levels—or the total number of bins required to meet the demand currently on the restaurant property has been described hereinbefore with reference to block 85 in FIG. 4. The following is a method to calculate the production time for each bin. First, the computer 20 may subtract the number of bins currently available in the kitchen service cabinet from the total number of bins required. The difference may be called the "total bin requirement". Next, the computer 20 may determine when the cabinet will likely run out of its current supply—the "buffer horizon". A method of determining the estimated remaining time per bin has been described hereinbefore with reference to block 86 in FIG. 4. Next, the computer 20 may determine when the first consumer will reach an ordering panel after the buffer runs out of its current supply. The time at which this would occur may be called the "downtime horizon". Finally, the computer 20 may estimate how long the kitchen crew may take to produce a bin once they are ordered to do so—the "production horizon". A method of forming such an estimate is described later hereinbelow.

The optimal production time ($T_i$) for the $i^{th}$ bin may be calculated as follows: (1) For each bin to be produced [1, 2, 3 ... total-bin-requirement]: (a) Simulate adding (i-1) bins to the buffer; (b) Calculate the downtime-horizon for the simulated buffer; (c) Ti=downtime-horizon-production-horizon. Optimally, a restaurant should produce a new bin at the last possible moment, such that it is ready for consumption just when it is needed. Such "just in time" production may minimize the component's bin time, providing for hotter, fresher product. However, in practice, the restaurant may choose to operate with a safety margin, keeping a few extra patties in the bin or maintain a predetermined minimum number of patties in the bin to guard against a production glitch. A temporal safety margin can be added to (1)(c) above, to provide room for error. A restaurant may produce patties by issuing a new cook command when $T_i$ drops to zero (or near zero, given a safety margin).

Estimating Demand for a Completed Product

Impending completed product demand may be estimated (i.e., product uncertainty modeling at block 88, FIG. 4) from consumer volume using methods similar to those employed to manage a component buffer. A distinction between component and completed product buffering is volume. In general, far fewer completed products are buffered than product components because many consumers require a special order and secondary shelf life for completed products is considerably shorter than that for food product components (e.g., burger patties).

Most quick-service restaurants have one or two sandwiches or hamburgers that dominate sales volume—and generally, one or two favored "preparations" for these sandwiches. For example, regular and plain cheeseburgers are likely to dominate many quick-service restaurants' sales volumes. Thus, an intuition behind this method of estimating demand for a completed product is that, if a human restaurant manager were able to closely monitor the number of patrons on the restaurant property, he or she would likely be able to predict that, "If there are 10 people out there, 2 of them are going to order a regular cheeseburger". In other words, the restaurant manager is intuitively calculating that this popular item will probably subsume 20% of the future orders for this group of consumers. Moreover, the manager's confidence is relatively high because there are 10 people out there—a statistically relevant sampling for this application. The method described herein seeks to automate this intuitive process by predicting when sufficient demand is present to justify confidence in deciding that it is time to pre-produce a specific completed sandwich.

An "expected value" or the "expected number of completed food products" that may be required over a predetermined time period may be found by multiplying the "expected value per order" by N (the number of unplaced orders). Several queue simulation methods have been described hereinbefore to estimate the number of unplaced orders on the restaurant property. A method of estimating the "expected value per order" for each completed food product is described later hereinbelow.

The "expected value" for a completed food product is the number of food products that the computer 20 expects that N unplaced orders will require, based on the restaurant's then-current product mix. A human restaurant manager may want to order the kitchen crew to produce with either more or less confidence than the computer 20, thus a "confidence filter" may be applied to the "expected value." For example, in one embodiment, the expected value may simply be multiplied by a gain, to produce a modified expected value. The gain itself may be a function of a second measure of the confidence that the completed product will actually be consumed within its secondary shelf life. The calculation of the mean time between orders (MTBO) for that particular product may serve as a secondary confidence measurement. The MTBO value may be scaled to produce an appropriate gain.

Further, the classification of automobiles (e.g., mini-vans vs. pickup trucks) and/or people (e.g., adult, child, male, female) may be used to modify the expected value for that particular order. Classification techniques can be used to improve completed product estimates for single orders. Intuitively, a restaurant manager may be able to guess that vehicles likely to contain children will have a higher probability of ordering children's meals, which contain, for example, single hamburgers or chicken nuggets. Similarly, restaurant managers may notice that construction vehicles are more likely to contain occupants who will order larger, meatier sandwiches, such as a burger with two or more patties. The classification of vehicles into vehicle types may be used to improve the expected value for that particular order. Thus, the identification of a vehicle as a "mini-van" would enable the computer 20 to increase the probable consumption of hamburgers and nuggets, and decrease the probable consumption of large sandwiches. Similarly, the classification of people as adult, child, male, female, etc. can be used to narrow the expected consumption for particular completed food products—and by extension, food product components.

Expected Value Per Order for a Single Product

As discussed hereinbefore, a queue simulator (i.e., the queue simulator or simulators selected for implementation as part of the buffer manager program code) outputs the expected time for each consumer order. The following describes a method for estimating the number of products, of a single type (e.g., cheeseburgers, fries, onion rings, etc.), that may be ordered in a single consumer order. In other words, the method described below attempts to answer the question: For each consumer order placed, how many cheeseburgers (as an example of a type of food product) does the human restaurant manager expect to be ordered through each such consumer order?

The expected value per order may be calculated by processing the restaurant's order data over a specific time window. In one embodiment, processing generally means an averaging, though weighted averaging may be more appropriate. Sales of individual products may be recorded and averaged using any standard or batch averaging technique. It is noted that products should preferably be tracked according to their completed state. Thus, for example, plain cheeseburgers may be tracked separately from cheeseburgers with ketchup only. Further, weighting factors may be included to skew the average toward more recent sales. Other processing techniques may be used to average out (or eliminate) anomalous events, such as the sudden sale of a very large number of products—for instance, the sudden sale of 25 cheeseburgers. These and other processing techniques may be necessary to maintain smooth, convergent behavior of the expected value of an individual product. Processed individual product sales may be normalized by the number of orders placed or normalized by the number of vehicles detected to generate the expected value per order for that individual product.

Buffer State Maintenance

The current state of a buffer may be maintained by collecting data from the kitchen employees (input block 90, FIG. 4) and updating a buffer state database that may be maintained internally (e.g., stored) on the computer 20 running the buffer manager program code. The buffer management system 18 may use multiple touch screen monitors (not shown as part of the system 18 illustrated in FIG. 2) to collect production data from, for example, the grill, fry machines, and food product assembly area. The data may also be collected from the point-of-sale system. Generally, the production data (at block 90) may cover the production of every food product component and its addition to the buffer; the production of a completed product; and the waste of components and/or completed products. The removal of product components from the buffer may be calculated from a usage menu associated with the completed product. Thus, as an example, for every double cheeseburger made, two burger patties may be removed from the component buffer.

Estimating Average Service Times

Queuing theoretic models require the estimation of various service times at stations throughout the queue where services are performed prior to the object moving on to the next station. Average service times may be estimated by taking direct measurements of the service processes or through the use of a standard parametric observer. In one embodiment, service times may be estimated from direct measurements at each restaurant. For example, a rough estimate of the service time may be taken with a stopwatch. It is observed that the average service times may not tend to vary considerably, thus estimates may be stable for long periods of time.

For those applications where service times do vary over time, direct measurement of the various events may be taken using, for example, the vision system. For example, by time-stamping the progress of an object from entrance, to parking, or into the drive-thru lane, various in-transit times may be estimated. Drive-thru and counter service times may be estimated either by using the vision system described hereinabove, to mark the forward progress of the queues, or by time-stamping consumer order data and noting the time elapsed between orders, or combinations of the above described methods. Further, point-to-point measurements of patrons can be accurately measured, and if only a portion of the patron is visible to the vision based system of the present invention, the present invention can provide estimates of travel times.

More sophisticated methods, such as the construction of a formal parametric observer to optimally estimate each of the average service times by processing together the several measurements previously noted may also be implemented. These methods are well known. It is, however, noted that the use of such sophisticated methods may not produce appreciably better restaurant performance in many applications than the performance produced by the less sophisticated methods previously mentioned.

An Exemplary Implementation

Figure 8:
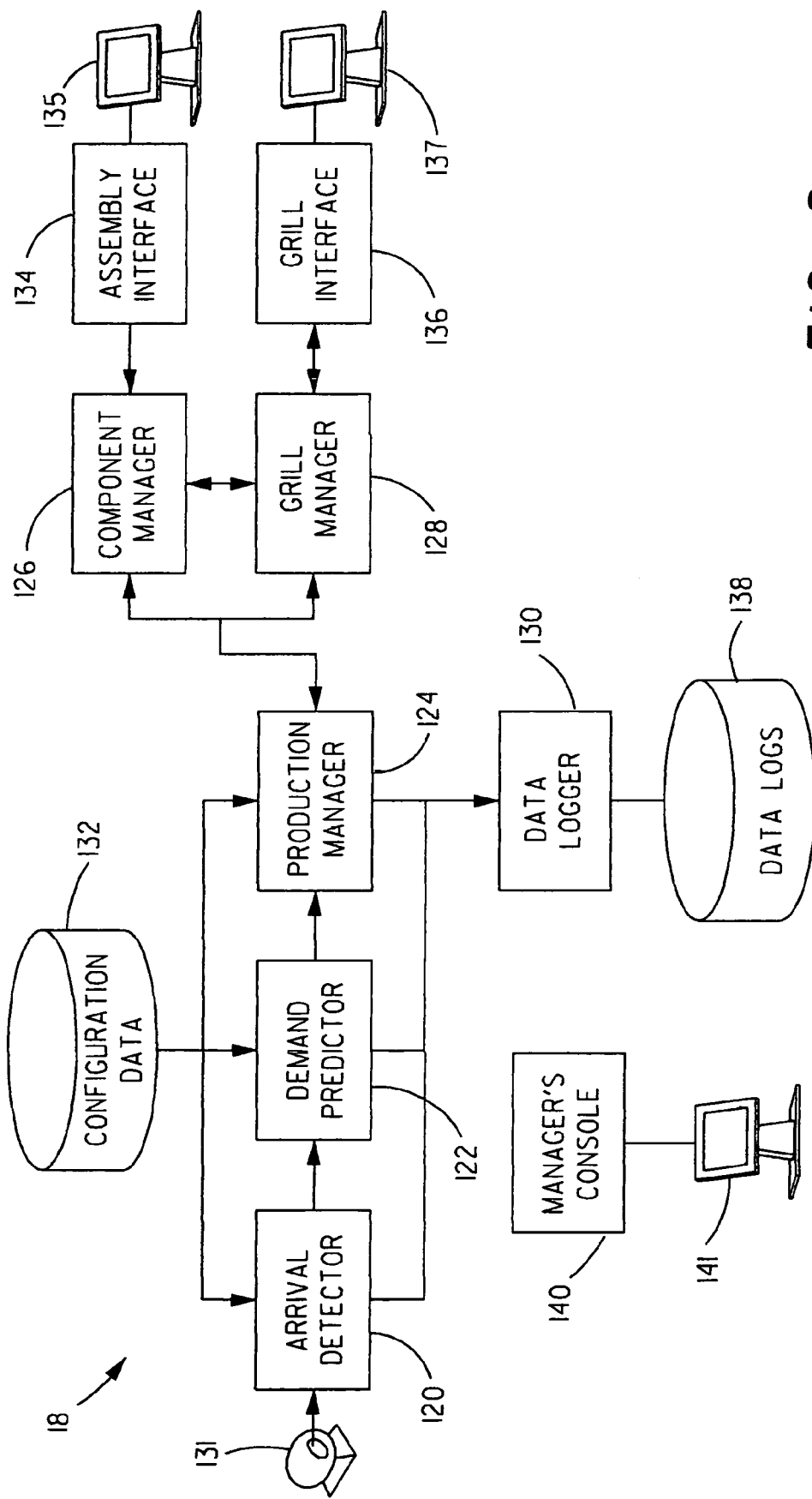
FIG. 8 is a block diagram of various functional elements constituting the buffer manager system according to one embodiment of the present invention.

FIG. 8 individually depicts various functional elements constituting the buffer manager system 18 according to a preferred embodiment of the present invention. As illustrated in FIG. 8, the major elements (including software modules) in the buffer manager system 18 include the arrival detector 120, the demand predictor 122, the production manager 124, the component manager 126, the grill manager 128, and the data logger 130. These elements cooperate with one another to implement various steps illustrated in FIG. 4. Because of the earlier detailed discussion of all the steps illustrated in FIG. 4, a detailed discussion of various modules or elements shown in FIG. 8 is not given. However, a brief description of each module is given hereinbelow for ease of reference.

Arrival Detector

As discussed earlier hereinbefore, the arrival detector 120 analyzes a live stream of images supplied by, for example, an entrance camera 131 and signals a software event when a car has entered the restaurant property.

Demand Predictor

The demand predictor 122 uses the car arrival events generated by the arrival detector 120 to generate an estimate of near-term demand for individual food product components (e.g., burger patties). In a preferred embodiment, the demand predictor 122 simply counts the number of car arrivals in the last M seconds and multiplies this count by a demand factor D to produce a projected near-term demand estimate E for each food product component of interest. The list of these components of interest, as well as the individual value of M and D for each component, is retrieved from the configuration database 132. The demand predictor 122 may update its estimates E once every second as well as immediately upon a car arrival event.

Production Manager

The production manager's 124 primary function is to coordinate the operations of the component manager 126 and the grill manager 128.

Component Manager

The component manager 126 is responsible for tracking the actual levels of available food product components in the staging buffer, as well as computing the proper amount of additional components needed to maintain an appropriate buffer level and satisfy impending demand. Tracking of current buffer levels is accomplished by monitoring the input supplied by the kitchen crew via the assembly and grill interfaces 134, 136 and their respective hardware data input/display monitors 135, 137. The grill interface 136 informs the component manager 126 of actual production events (i.e., supply of new components to the buffer), while the assembly interface 134 signals when and how many units of a particular component are withdrawn from the buffer to assemble sandwiches. The component manager 126 may also generate a value called "buffer deficit" for each buffered component. This value indicates the number of components needed, in addition to the current amount on hand. The deficit number is the sum of two components: Target Deficit and Projected Demand. The target deficit is the difference between the current target level and the current actual buffer level, while projected demand is the output from the demand predictor 122. The current target level is obtained from a "buffer schedule" stored in the configuration database 132. This schedule contains the appropriate target levels, as determined by the human restaurant manager, for particular time periods of the day.

Grill Manager

The grill manager 128 determines when to inform the kitchen crew in the restaurant's grill section that a batch of a particular food product component should be cooked. In order to make the production decision, the grill manager 128 may consider the current buffer deficit value computed by the component manager 126 as well as the "batch size" in effect for a particular component, i.e., the number of components that should be cooked simultaneously. Batch sizes for each component are part of the buffer schedule so that different values may be in effect during different times of the day. In one embodiment, a production decision is signaled whenever the current buffer deficit exceeds one-half of the current batch size. The grill manager 128 sends this decision event to the grill interface 136 to be displayed on the terminal 137 for the grill crew.

Assembly Interface

The assembly interface module 134 implements the user-interface code to drive the touch-screen 135 located in the food assembly area. Assembly crewmembers touch button areas on the screen 135 to indicate the type and number of sandwiches they are producing to fill customers' orders. This information is then sent to the component manager 126.

Grill Interface

The grill interface module 136 implements the user-interface code to drive the touch-screen 137 located, for example, above a grill. It may always display the current buffer levels, as well as indicating when a production decision was received by the grill manager 128. In the latter case, the desired batch size may be displayed as well. Crewmembers may respond by touching corresponding button areas on the screen 137 to tell the grill manager 128 when they have started a cooking cycle. The grill interface 136 conveys this information to the grill manager 128.

Data Logger

The data logger 130 collects operational data across the entire buffer management system and writes them to a database 138 for future reference or for troubleshooting.

Manager Console

The manager's console 140 may be a back-office user interface module that allows the human restaurant manager to monitor the whole food preparation and delivery operations and adjust operational parameters (of one or more software modules in FIG. 8) as needed using the touch-screen monitor 141.

An Alternate Exemplary Implementation

Figure 11:
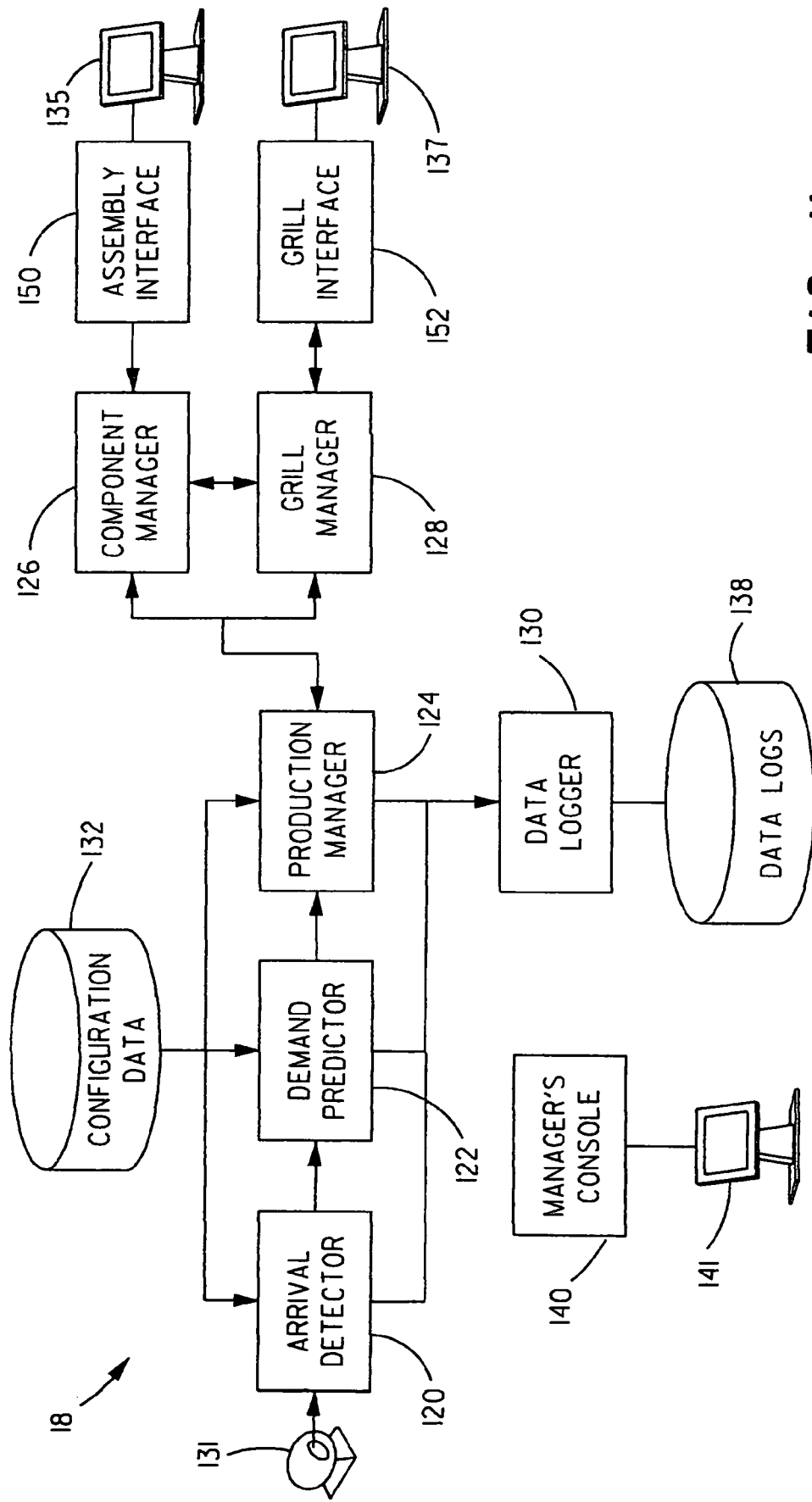
FIG. 11 is a block diagram of various functional elements constituting the buffer manager system according to another embodiment of the present invention.

FIG. 11 individually depicts various functional elements constituting buffer manger system 18 according to an extension of the previous embodiment of the present invention or an alternate embodiment of the present invention. The major elements (including software modules) of buffer manager system 18 shown in FIG. 11 are the same as the major elements (including software modules) of buffer manager system 18 shown in FIG. 8, except that the assembly interface and the grill interface 134 and 136, respectively, of buffer manager system 18 shown in FIG. 8 can be augmented by or replaced with the assembly interface and the grill interface 150 and 152, respectively, of buffer manager system 18 shown in FIG. 11. Since, with the exception of assembly interface 150 and grill interface 152 of buffer manager system 18 shown in FIG. 11, the major elements (including software modules) of the buffer manager systems 18 shown in FIG. 8 and 11 are the same, descriptions of these major elements (including software modules), except for assembly interface 150 and grill interface 152, will not be further described herein to avoid unnecessary redundancy.

The operation of grill interface 152 and assembly interface 150 in accordance with the embodiment of buffer manager system 18 shown in FIG. 11 will now be described with reference to FIG. 12 which shows grill interface 152 and assembly interface 150 in operative relation to various exemplary food processing stations of a schematic view of an exemplary kitchen. Exemplary food processing stations associated with the components comprising grill interface 152 can include a flame broiler 160 and/or grill 162 and a holding cabinet or buffer 164 for holding completed food product. Exemplary food processing stations associated with the components comprising assembly interface 150 can include a bun tray cart 166, an optional bun toaster 168, an application station 170 having one or more positions for the application of condiment(s)/topping(s), an assembly and packaging station 172 (shown in front of holding cabinet 164 for simplicity) where the final assembly and packaging of completed food product is accomplished, and a warming zone station 174 where packaged completed food product(s) is/are stored prior to delivery to a patron or disposal if not delivered within a predetermined period of time after delivery to warming zone station 174.

When kitchen includes flame broiler 160, assembly interface 152 can include sensor 180 and/or sensor 182 for detecting the presence of uncooked food product component(s), e.g. burger patties, entering flame broiler 160 and/or the presence of cooked food product component(s) exiting flame broiler 160, respectively. If kitchen also or alternatively includes grill 162, grill interface 152 can include one or more sensors 184 positioned to detect the presence of one or more cooked and/or uncooked food product component(s) on grill 162. Grill 162 can be a single temperature grill or a grill having multiple heating zones, i.e., and multi-heating zone grill. Where grill 162 is a multi-heating zone grill, buffer manager system 18 can utilize any number of sensors 184 along with one or more suitable imaging techniques to detect the amount of food product in each zone of grill 162. Sensors 180, 182, 184, and 186-210 (discussed hereinafter) are specific instances of sensor(s) 22 generally shown in FIG. 2, the implementation which is discussed in detail above.

Cooked food product components prepared by flame broiler 160 and/or grill 162 can be transported to and stored or staged in holding cabinet 164 for subsequent processing or assembly into completed food product. One or more sensors 186 can be positioned to detect cooked food product being placed into or removed from holding cabinet 164. By way of sensors 180, 182, 184 and/or 186 and suitable image processing software, buffer manager system 18 can track the number of food product components currently in a cooking queue in flame broiler 160 and/or on grill 162 as well as the number of cooked food product components currently residing in holding cabinet 164 for use in making completed food product. Where grill 162 is a multi-heating zone grill, grill 162 can be utilized to stage cooked food product for subsequent processing or assembly in the completed food product in the same manner as holding cabinet 164. Where grill 162 is a multi-heating zone grill, one or more sensors 184 can be utilized to track the number of food product components currently in the cooking queue as well as the number of cooked food product components available for processing or assembly into completed food product by way of their position on grill 162.

Moreover, by way of one or more sensors 186 and suitable imaging software, buffer manager system 18 can track the amount of time each cooked food product component resides in holding cabinet 164. To this end, as is known in the art, holding cabinet 164 typically holds plurality of spaced trays, each of which is configured to hold a certain amount of cooked food product component. By way of one or more sensors 186 and one or more and suitable imaging techniques, buffer manager system 18 can track when a cooked food product component is added to or removed from a tray of holding cabinet 164. Utilizing one or more suitable imaging techniques for detecting when an object is moved into or out of a field of view of sensor 186, buffer manager system 18 can determine when a cooked food product component is added to or removed from a tray of holding cabinet 164. To facilitate buffer manager system 18 distinguishing the addition or removal of a particular food product from holding cabinet 164, each tray of holding cabinet 164 that holds a different food product can include a unique marking or color to facilitate distinguishing it from another tray. For example, each tray of holding cabinet 164 used to store cooked hamburgers can be of a first color while each tray used for storing chicken patties can be of a second color. As can be appreciated, holding cabinet 164 acts as a buffer for cooked food product component(s) that may be incorporated into completed food product. While a single holding cabinet 164 is illustrated, it is to be understood that any number of holding cabinets 164 can be provided as required to provide a sufficient buffer of cooked food product component(s) for incorporation into completed food product.

Also or alternatively, buffer manager system 18 can determine the quantity of each cooked food product in holding cabinet 164 from the difference of the number of cooked food product removed from flame broiler 160 and/or grill 162 and the number of cooked food product processed or assembled into completed food product at application station 170. For example, if ten hamburger patties have been cooked but only two hamburger patties have been assembled into completed food product, the difference (eight hamburger patties) is construed by buffer manager system 18 as the number of hamburger patties residing in holding cabinet 164.

The discussion herein of holding cabinet 164 for staging cooked food product is not to be construed as limiting the invention since, as discussed above, grill 162 can be a multi-heating zone grill wherein cooked food product components can also be staged for assembly into completed food product.

Where cooked food product components are cooked to order, each cooked food product component leaving flame broiler 160 and/or grill 162 can be assembled into completed food product at a food product component assembly and packaging station 172 (discussed hereinafter) of assembly interface 150 thereby obviating the need for holding cabinet 164.

Desirably, sensors 180-186 and 190-210 (discussed hereinafter) are color based, visual sensors, desirably implemented as two-dimensional color cameras. However, this is not to be construed as limiting the invention since it is envisioned that one or more of said sensors can be radiative sensors, such as, without limitation, an infrared sensor.

Assembly interface 150 includes sensor 190 positioned for detecting the transfer of buns, or other bread product(s), from bun tray cart 166 to application station 170, either directly or via bun toaster 168, if provided. A single bun tray cart 166 holds a buffer of buns or other bread product(s) for incorporation into completed food product. Sensor 190 or another sensor (not shown), can also be positioned for detecting when a bun tray cart 166 depleted of buns is removed from the field of view of sensor 190 and a new bun tray cart 166 is positioned therein.

Where each new bun tray cart 166 includes a predetermined number of buns, the introduction of a new bun tray cart 166 into the field of view of said sensor can automatically be construed by buffer manager system 18 as an indication that the predetermined number of buns on said new bun tray cart 166 are available in the buffer represented by the new bun tray cart 166 for incorporation into completed food product. Alternatively, when the number of buns on a new bun tray cart 166 can vary, in response to the introduction of the new bun tray cart 166 into the field of view of said sensor, buffer manager system 18 can cause a suitable prompt to be displayed on input/display monitor 135 for kitchen personnel to enter into buffer manager system 18 the number of buns on said new bun tray cart 166. By virtue of knowing the number of buns on each new bun tray cart 166 introduced into the field of view of sensor 190 and by virtue of being able to detect via sensor 190 the number of food product components (e.g., buns) removed from bun tray cart 166, buffer manager system 18 can predict a remaining time before bun tray cart 166 is empty based on a predicted amount of food to be ordered (discussed above), an amount of prepared food product in inventory (discussed hereinafter) and/or an amount of food product being prepared (discussed hereinafter). Buffer manager system 18 can be programmed with a predetermined interval of time for replacing an empty or near empty bun tray cart 166 with a new bun tray cart 166 having the predetermined number of buns or a number of buns determined by the kitchen personnel. Buffer manager system 18 can compare the remaining time to the predetermined interval of time and can generate an audible or visual signal on input/output display 135 for the kitchen personnel to replace the empty or near empty bun tray cart 166 with a new bun tray cart 166 when the remaining time is less than or equal to the predetermined time.

Buns removed from bun tray cart 166 are processed along a path P. More specifically, buns removed from bun tray cart 166 can have condiment(s)/topping(s) applied thereto at one or more positions of application station 170. To this end, a sensor 192 can be positioned to detect the presence of a toasted or un-toasted bun at a first position of application station 170. Sensor 192 can also be configured to detect the application of condiment(s)/topping(s) on each bun at said first position of application station 170. Assuming all the condiment(s)/topping(s) desired to be added to a particular bun at the first position of application station 170 is complete, the thus processed bun is moved, as necessary, through any second and subsequent positions of application station 170 for the addition of further condiment(s)/topping(s) as required. Each of the second and subsequent stations of application station 170 can include an instance of a sensor 194 positioned to detect the presence of a bun passing through its field of view and/or the addition of condiment(s)/topping(s) on the bun while the bun is in said field of view. The description of application station 170 as having a plurality positions, however, is not to be construed as limiting the invention since it is envisioned that application station can have only a single position for the application of condiment(s)/topping(s).

Once all the condiment(s)/topping(s) have been applied to a bun at application station 170, the bun is moved to food product component assembly and packaging station 172 in the field of view of sensor 186. Sensor 186 can be positioned to detect the removal of each cooked food product component from holding cabinet 164, if provided, and/or to detect the use of each cooked food product component in a completed food product and the packaging of said completed food product, even where one or more of said cooked food product component comes to food product component assembly and packaging station 172 directly from flame broiler 160 and/or grill 162.

Each packaged food product component can then be moved from food product component assembly and packaging station 172 to warming zone station 174. Assembly interface 150 includes a camera 196 positioned to view the entry and removal of completed food product components into and out of warming zone station 174.

By way of sensors 190, 192, 194 and 186 of assembly interface 150 and the use of suitable image processing software, buffer manager system 18 can monitor the processing of buns, including the addition of specific condiment(s) and/or topping(s) to buns, and food product components placed into and removed from holding cabinet 164 to form completed food product which is packaged and stored at warming zone station 174. For example, utilizing one or more of the image processing software techniques described above, such as, without limitation, background subtraction, buffer manager system 18 can detect the removal of a bun from bun tray 166 by way of sensor 190 and can detect the entry of a bun into the field of view of sensor 192. Thereafter, by way of images captured by sensor 192, buffer manager system 18 can determine when each condiment and/or topping is applied to the bun in the field of view of sensor 192. For example, where a condiment has unique color, e.g., red for ketchup, yellow for mustard, and white for mayonnaise, the application of one or more of said condiments can be detected by sensor 192 with reference to the unique color(s) thereof for processing by buffer manager system 18 in connection with the bun to which said condiment(s) is applied. Similarly, buffer manager system 18 can process images output by sensor 192 to detect different colors and/or shapes of toppings applied to the bun in the field of view of sensor 192. For example, buffer manager system can be configured to detect the difference between red tomatoes and green leaf lettuce in the field of view of sensor 192 based on the difference in color. Where two or more toppings and/or condiments have approximately the same color, e.g., lettuce leaf and pickle; or tomato and ketchup, the size and/or shape of each topping or condiments can be utilized to detect its presence on the bun in the field of view of sensor 192.

If desired, to facilitate detection of when a condiment and/ or topping has been applied to a bun, the application of condiment(s) and/or topping(s) to a bun can be distributed throughout the fields of view of sensor 192 and each instance of sensor 194 whereupon only one or a few readily detectable condiment(s) and/or topping(s) are applied in the field of view of each respective sensor. Thus, for example, application station can be configured such that only ketchup, mustard and mayonnaise can be applied to a bun in the field of view of sensor 192, lettuce and tomato can be applied to a bun in the field of view of a first instance of sensor 194 and pickles can be applied to a bun in the field of view of a second instance of sensor 194. Thus, ambiguity in the detection of which condiment(s) and/or topping(s) are applied to a particular bun can be minimized or avoided.

To facilitate quality control, buffer manager system 18 can track the assembly of each completed food product by way of sensors 190, 192, 194 and/or 186 and can compare said assembly to a patron order displayed on a display for review by kitchen personnel assembling the completed food product. For example, if a patron orders a cheeseburger with ketchup, mustard and lettuce, buffer manager system 18 can track the assembly of this order by way of sensors 190, 192, 194 and/or 186 to ensure that only ketchup, mustard, lettuce, cheese, a burger patty and a bun are incorporated into the completed food product being ordered. In the event buffer manager system 18 by way of sensors 190, 192, 194 and/or 186 detects that a desired condiment or topping has not been added to the order, or that an undesired condiment or topping has been added to the order, buffer manager system 18 can cause a suitable audible and/or visual notification to be output to kitchen personnel advising them of such.

By way of sensors 190, 192, 194 and/or 186, buffer manager system 18 can track the assembly of completed food product and, thereby, an interval of time required to completely assembly the completed food product. For example, by way of sensor 190, buffer manager system 18 can detect the time a bun or other bread product is removed from bun tray cart 166. Thereafter, by way of sensors 192 and/or 194, buffer manager system 18 can track the progress of said bun through the various positions of application station 170. By way of sensor 186 or 196, buffer manager system 18 can determine a time when the completed food product is packaged at station 172 or delivered to warming zone station 174, respectively. Buffer manager system 18 can determine the difference between this latter time and the time the bun was first removed from bun tray cart 166 to determine the total assembly time for the corresponding completed food product. Buffer manager system 18 can store a plurality of such assembly times in a suitable storage wherefrom an average assembly time for one or more different completed food products can be determined. This information can then be used to access the completed food product assembly process wherefrom a restaurant manager can make informed decisions whether more, less or different kitchen personnel and/or different equipment is/are needed to improve the efficiency and/or throughput of the assembly process.

Each condiment and/or topping of application station 170 can have a buffer of the corresponding product to facilitate efficient assembly of completed food product. Assuming buffer manager system 18 knows for each said buffer the amount or volume included therein, buffer manager system 18 can, by way of sensors 190, 192, 194 and/or 186, track the usage thereof whereupon buffer manager system 18 can make a real time estimate of the remaining time before a buffer is empty based on the predicted demand for completed food product, the amount of food product in warming zone station 174 and/or the amount of food product currently being assembled. For example, if a buffer for a condiment, such as ketchup, initially holds a predetermined number of applications thereof, buffer manager system 18 can track each application of ketchup to a bun by way of one or more sensors 192, 194, and/or a counter operative to measure the dispensing of a predetermined amount of the condiment via a suitable dispensing means (not shown) known in the art. Based on the number of actual applications and the predetermined number of applications, buffer manager system 18 can determine how many additional applications of the condiment remain in the buffer. Armed with this information, along with the predicted demand for an amount of food to be ordered in the specified time interval following the generation of the data utilized to make said prediction, the amount of completed food product in inventory and/or the amount of food product currently being assembled, buffer manager system 18 can estimate a remaining time before said buffer is empty. If this remaining time is less than or equal to a predetermined interval of time for restocking said buffer, buffer manager system 18 can cause a suitable audile and/or visual signal to be output notifying kitchen personnel that said buffer requires restocking.

In a similar manner, buffer manager system 18 can track the amount of a topping remaining in a buffer therefore and can alert kitchen personnel when said buffer needs replacing. In the case of a topping buffer, however, if by way of sensors 192, 194, buffer manager system 18 would have difficulty detecting the current amount of topping remaining in said buffer, buffer manager system 18 can utilize any other desirable and/or suitable type of nonvisual sensor means, e.g., without limitation, a weight sensor, to detect the remaining amount of food in a topping buffer. For example, if a topping buffer comprises a tray of said topping, buffer manager system 18 can determine the amount of topping remaining in said tray by subtracting the weight of the tray from the combined weight of the tray and the topping. Armed with this information along with information regarding the average weight of the topping utilized with each food product being assembled, the predicted demand for an amount of food product to be ordered in a specified time interval immediately preceding the generation of the data utilized to make said prediction, the amount of completed food product in inventory and/or the amount of food product being assembled, buffer manager system 18 can predict the remaining time before the topping buffer is empty. When this remaining time is less than or equal to a predetermined interval of time for restocking said buffer, buffer manager system 18 can cause a suitable audio and or visual signal to be output to kitchen personnel to restock said topping buffer.

Also or alternatively, buffer manager system 18 can make a real time estimate of the remaining time before any buffer is empty based on a time derivative (i.e., d/dt) of any one or a combination of the following: the predicted demand for completed food product; the amount of prepared food product in inventory; and/or the amount of food product currently being prepared. Each time derivative can be a first order (i.e., d/dt), second order (i.e., $d^2/dt^2$), etc, derivative as deemed suitable and/or desirable by one skilled in the art. Moreover, the use of any combination of the predicted demand for completed food product; the amount of prepared food product in inventory; the amount of food product currently being prepared and/or a time derivative ($1^{st}$ order, $2^{nd}$ order, etc.) of one of more of the foregoing to predict when to restock a buffer is envisioned.

By way of sensor 196 and suitable imaging software, buffer manager system 18 can also determine when a packaged completed food product is placed into warming zone station 174, how long each packaged completed food product resides in warming zone station 174 and when each packaged food product component is removed from warming zone station 174 for delivery to a patron. If buffer manager system 18 determines that a packaged completed food product has resided in warming zone station 174 in excess of a predetermined maximum warming time, buffer manager system 18 can cause a suitable audible and/or visual notice to be output to kitchen personnel to dispose of said packaged completed food product.

In the embodiment shown in FIG. 12, sensor 186 is shared by assembly interface 150 and grill interface 152. However, this is not to be construed as limiting the invention since the above described functions performed by sensor 186 can be accomplished by two or more instances of sensor 186 positioned at different stations or positioned with different views of assembly and packaging station 172.

The embodiments of assembly interface 150 and grill interface 152 shown in FIG. 12 include sensors for detecting, among other things, the processing of discrete food product components, condiment(s) and topping(s) into completed food product, the storage of discrete food product components and packaged completed food products, and the delivery of packaged completed food product to a patron. However, as is well-known, food outlets also or alternatively serve bulk food product(s), such as fires, onion rings, and the like. Accordingly, it would be desirable that assembly interface 150 and/or grill interface 152 also or alternatively be able to monitor the processing, storage and delivery of such bulk food product(s).

With reference to FIG. 13 and with continuing reference to FIG. 12, in order to monitor the processing, storage and delivery of bulk food product, grill interface 152 can include a sensor 200 situated with its field of view positioned to observe cooked bulk food product residing in a bulk product holding buffer 202. By way of sensor 200, and suitable image processing software of the type described above, buffer manager system 18 can estimate the amount of cooked bulk food product stored in bulk product holding buffer 202. For example, buffer manager system 18 can determine the dimensions of bulk food product contained in bulk product holding buffer 202 by way of differences in the colors thereof detected by sensor 200. Based on these dimensions and a known shape of bulk product holding bin 202 (e.g., arcuate-shaped, rectangular funnel-shaped, etc.) buffer manager system 18 can estimate the volume of cooked bulk food product presently stored in bulk product holding bin 202.

FIG. 13 also shows that assembly interface 150 can also or alternatively include a sensor 210 situated with its field of view positioned to observe packaged bulk food product inventoried in a warming zone station 208 or to observe the passage of packaged bulk food product therethrough for delivery to a patron. In a manner discussed above, buffer manager system 18 can predict the type, e.g., large, medium or small, packaged bulk food product to be ordered and, by way of packaging color and/or the dimensions of bulk food product contained in each package, the amount of packaged bulk food product available in warming zone station 208 for delivery to patrons. Utilizing this information, buffer manager system 18 can predict, in real-time, the remaining time before bulk product holding buffer 202 is empty based on a predicted amount of bulk food product food to be ordered, an amount of bulk food product in warming zone station 208 and/or an amount of bulk food product being prepared. When this remaining time is less than or equal to a predetermined interval of time for restocking bulk product holding buffer 202, buffer manager system 18 can cause a suitable audile and/or visual signal to be output to kitchen personnel to commence cooking another batch of bulk food product.

To further facilitate buffer manager system 18 predicting the time to commence cooking another batch of bulk food product, a sensor 204 can be positioned to detect when uncooked bulk food product is first being introduced into a deep fryer 206 and/or when cooked bulk food product is being removed from deep fryer 206. Armed with a known time to cook a particular bulk food product and the time the bulk food product was introduced into deep fryer 206, buffer manager system 18 can estimate the amount of cooking and cooked bulk food product available when making its real-time prediction when to commence cooking the next batch of bulk food product.

By way of sensor 210 and suitable image processing software, buffer manager system 18 can detect when packaged bulk food product is placed into and removed from warming zone station 208. If buffer manager system 18 determines that a packaged bulk food product has resided in warming zone station 208 in excess of a predetermined maximum warming time, buffer manager system 18 can cause a suitable audible and/or visual notice to be output to kitchen personnel to dispose of said packaged bulk food product.

By way of the sensor(s) associated with assembly interface 150 and grill interface 152, and suitable image processing software, buffer manager system 18 can determine, in real-time, the amount and/or volume of discrete and/or bulk food product components being processed and/or stored, as well as the amount and/or volume of completed food product currently in inventory and/or being delivered to a patron. The use of the sensors associated with assembly interface 150 and/or grill interface 152 reduces or avoids the need for kitchen personnel to interact with input/display monitor(s) 135 and/or 137 to acknowledge the need to cook or restock discrete or bulk food product. In addition, by way of sensors 196 and 210, buffer manager system 18 can automatically track the time each packaged completed food product enters warming zone stations 174 and 208 and can track how long each packaged and completed food product remains therein. Desirably, each packaged and completed food product has a packaging or dimensions that can be readily identified by sensors 196 and 210 whereupon buffer manager system 18 can compare the duration each packaged and completed food product is in its respective warming zone station against a predetermined maximum storage time therefor, whereupon, if the predetermined maximum storage time is exceeded, a suitable notification can be output to inform kitchen personnel that the packaged and completed food product requires disposal.

The foregoing describes a real-time buffer manager system that calculates optimal food buffer levels, for both completed products and product components, based on real-time counts of restaurant patrons throughout a restaurant's property and real-time counts of the number of discrete and bulk food product components and completed food product(s) in various stages of processing from un-cooked food product components to packaged completed food product. The real-time buffer manager system 18 employs a computer vision system, running a series of 2D image processing techniques that can detect and track vehicles, people, food product components, partially assembled food product(s) and packaged and completed food products in several camera views. The system's cameras may be pointed at any of several key locations throughout the restaurant's property, including the property's entrance and exits, the drive-thru lane, the parking area, the restaurant's entrance and exit doors, the front counter area and various processing stations in the kitchen. Patron counts are fed from the computer vision system into a queuing model that estimates when each patron will arrive at an ordering station. Simultaneously, a parametric observer takes inputs either from kitchen personnel or from the cameras positioned in the kitchen area to track several key pieces of production information including, without limitation, the number of products and components in food buffer(s), and average times for ordering and production. The buffer manager estimates, in real-time, the probable demand for completed food products and food product components, based on the number of patrons detected, the estimated time for them to arrive at an ordering station and an amount or volume of completed food products already available or in process. This information is displayed to the kitchen personnel, who then can prepare any additionally required food products or restock any additionally required food product components. Thus, instead of analyzing historical sales data, buffer manager system 18 according to the present invention electronically performs direct measurement of probable future demand, and electronically predicts, in real-time, what the future food product demand will be in a predetermined time (e.g., 3-5 minutes) immediately following the direct measurement of the demand, and electronically determines the completed food products and food product components on hand and being assembled or prepared.

In one embodiment, the present invention can collect and log store operational data including but not limited to any of the above described data measurements and speed-of-service measurements, quality measurements, waste measurements, in process food products and food product components and completed food products and food product components. Such operational data can be aggregated across multiple stores into one or more databases. The information in the database can either be reported to a manager (such as a regional manager or managerial office) or another location via telephone, fax, internet, intranet and/or further analyzed to find ways to improve one or more store operations.

Figure 14:
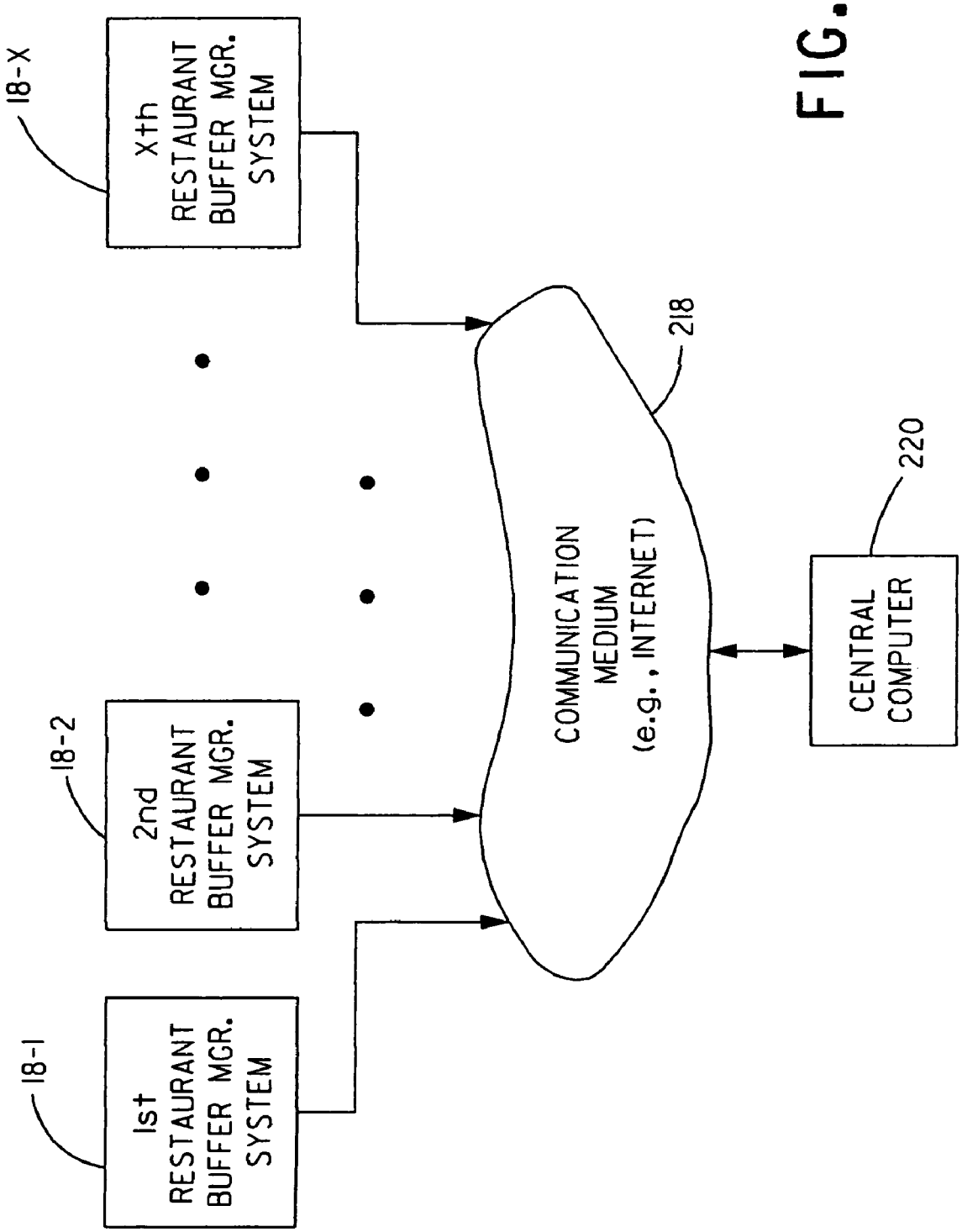
FIG. 14 is a block diagram of a number of buffer manager systems connected via a communication medium to a central computer that is configured to collect and analyze operations data provided thereto from one or more of the buffer manager systems.

For example, as shown in FIG. 14, a plurality of buffer manager systems 18-1, 18-2, . . . , 18-x can be communicatively coupled via a communication medium 218, such as, without limitation, the Internet, to a central computer 220. By way of communication medium 218, each buffer manager systems 18-1, 18-2, . . . , 18-x can communicate its operational data to central computer 220. Central computer 220 can be configured to not only receive and aggregate the operation data, but to also perform analysis on the operational data to determine regional and/or global (restaurant chain) trends such as, without limitation, production bottlenecks, food product customer ordering trends, waste trends, the degree of correlation between predicted food product orders and actual food product orders, and any other suitable and/or desirable trends that can be obtained or derived from any one or a combination of the data comprising the operations data.

Once one or more trends have been determined, central computer 220 can communicate to each of one or more buffer manager systems 18-1, 18-2, . . . , 18-x one or more suitable software updates to modify the operation of the buffer manager systems 18 to optimize the operation thereof in view of the previously obtained operational data, e.g., without limitation, to reduce waste. Also or alternatively, central computer 220 can communicate to an operator thereof information regarding modifying the operation of a particular restaurant to reduce or avoid one or more bottlenecks. Such information may include, without limitation, the need for additional food preparation capacity (e.g., cooking capacity, condiment application capacity, etc.), additional (or less) restaurant space, and/or any other suitable and/or desirable information that may be useful for optimizing the food quality, time of service and/or revenue generating capacity of one or more restaurants.

While a single central computer 220 is shown, it is envisioned that the above-described function(s) performed by central computer 220 can be distributed across two or more networked computers. Accordingly, the illustration and discussion of a single central computer 220 is not to be construed as limiting the invention in any manner.

Equipment

All sections that describe a vision based algorithm can share the same processing hardware which can include: a Shuttle SS50C computing system with Intel P4 (2 GHz) processor, 512 MB RAM, 20 GB hard disk space, and two (2) Winnov 1020 or 4400 AV framegrabbers (Winnov, Sunnyvale, Calif.). Further, depending if the component described is using grayscale or color cameras the following hardware descriptions can be used: Visiontech black and white, weatherproof, standard security cameras (e.g., Vision-Tech VB19WB or VB19WW, Visiontech, Paso Robles, Calif.) with each camera rated at 0.5 lux and 380 line resolution and Visiontech color, weatherproof, standard security cameras (e.g., Vision-Tech VC23WB, Visiontech, Paso Robles, Calif.) with each camera rated at 0.5 lux and 380 line resolution.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of real time food production management comprising:
   (a) electronically predicting, based on real time data, demand for an amount of food to be ordered at a food outlet in a specified interval immediately succeeding the generation of said real time data;
   (b) electronically determining from one or more images of actual food product and actual food product that is being assembled into completed food product acquired in real time by one or more electronic sensors positioned about the food outlet, an amount of completed food product in inventory and an amount of food product that is being assembled into completed food product;
   (c) serving completed food product from said inventory to patrons of said food outlet; and
   (d) electronically performing at least one of the following in real time:
      determining an amount of additional food product requiring preparation beyond the amount of completed food product in inventory and/or the amount of food product being assembled into completed food product in order to satisfy said predicted demand for an amount of food to be ordered;
      determining an interval of time at least one completed food product has been in inventory;
      determining an interval of time that a cooked food product component has resided in a cooked food product buffer;
      determining an interval of time to assemble at least one completed food product; and determining an amount at least one of the following:
(i) a food product component;
(ii) a condiment; and
(iii) a topping
residing in a food product assembly buffer based on an initial amount in said buffer and at least one of the following: the predicted amount of food to be ordered, the amount of completed food product in inventory, and the amount of food product being assembled into completed food product.

2. The method of claim 1, wherein at least one of said electronic sensors is either a color camera or an infrared camera.

3. A real time food production management system comprising:
means for electronically generating real time data about food consumers inside or in the vicinity of a food outlet, an amount of prepared food available to serve and an amount of food being prepared, wherein said means for electronically generating includes one or more electronic sensors and a computer operative for processing the real time data electronically generated by said one or more electronic sensors based on electronic images of the prepared food and the food being prepared acquired by said one or more electronic sensors;
means for electronically predicting, a demand for an amount of food to be ordered by said food consumers in a specified interval immediately succeeding the generation of said real time data; and
means for electronically determining, based on said real time data, at least one of the following:
a predicted amount of additional food requiring preparation in excess of the amount of the prepared food and/or the amount of food being prepared in order to satisfy said predicted demand for the amount of food to be ordered;
an interval of time at least one prepared food product has been available to serve;
an interval of time that a cooked food component that can be incorporated into food being prepared has been cooked; and
an amount of at least one of the following:
(i) a food component;
(ii) a condiment used in the food being prepared; and
(iii) a topping
used in the food being prepared residing in a food product assembly buffer based on an initial amount in said buffer and at least one of the following: the predicted amount of food to be ordered, the amount of prepared food available to serve, and the amount of food product being prepared.

4. The system of claim 3, wherein the electronic sensor is a color camera.

5. A real time food production management system comprising:
a plurality of sensors situated inside and in the vicinity of a food outlet for electronically acquiring images inside and in the vicinity of a food outlet to generate sensor data about: the presence of food consumers inside and in the vicinity of said food outlet, an amount of prepared food in inventory, and an amount of food product being prepared; wherein the acquired images include images of the prepared food in inventory and images of the food product being prepared; and
a computer containing a program code, which, upon execution by a processor of said computer, causes said processor to perform the following in real time:
analyze said sensor data to generate digital data about said food consumers, said amount of prepared food product in inventory, and said amount of food product being prepared;
predict, based on said digital data, demand for an amount of food product to be ordered by said food consumers a time following generation of said digital data; and
determine, based on said digital data, at least one of the following:
an amount of food product requiring preparation in excess of the at least one of the amount of prepared food product in inventory and the amount of food product being prepared in order to satisfy said predicted demand;
an interval of time at least one prepared food product has been in inventory;
an interval of time that a cooked food product component that can be incorporated into a food product being prepared has been cooked;
an interval of time to prepare at least one prepared food product; and
a buffer level of at least one of the following:
(i) a food product component;
(ii) a condiment used in the preparation of food product; and
(iii) a topping
used in the preparation of food product, based on an initial level in said buffer and at least one of: the predicted amount of food to be ordered, the amount of prepared food product in inventory, and the amount of food product being prepared.

6. The system of claim 5, wherein the food product is discrete food product, bulk food product or some combination of discrete and bulk food product.

7. A method of real time food production management comprising:
electronically generating real time data about an amount of prepared food product in inventory and an amount of food product being prepared based on one or more images of the prepared food product in inventory and the food product being prepared acquired by one or more electronic sensors; and
electronically determining, based on said real time data, at least one of:
when to dispose of at least one prepared food product that has been in inventory exceeding a first interval of time;
when to dispose of at least one cooked food component that has been available for incorporation into food product being prepared for an interval exceeding a second interval of time;
a time to commence preparation of at least one prepared food product for inventory; and
a level of a buffer of at least one of the following that can be incorporated into food product being prepared: (i) a food product component, (ii) a condiment, and (iii) a topping.

8. The method of claim 7, wherein electronically generating real time data includes electronically tracking and counting at least one of the following: one or more food product components that can be incorporated into food product being prepared, one or more food products being prepared and one or more prepared food products in inventory.

9. The method of claim 7, further including:
electronically estimating, in real time, a remaining time before at least one buffer is empty;

electronically comparing said remaining time to a predetermined interval of time for restocking said one buffer; and electronically generating, as a function of said comparison, an indication to restock said one buffer.

10. The method of claim 9, wherein the remaining time before said one buffer is empty is electronically determined based on at least two of the following: an initial level in said buffer, the amount of prepared food product in inventory, a time derivative of the amount of prepared food product in inventory, the amount of food product being prepared, a time derivative of the amount of food product being prepared, a predicted amount of prepared food product to be ordered and a time derivative of the predicted amount of prepared food product to be ordered.

11. The method of claim 10, wherein the predicted amount of prepared food product to be ordered is determined electronically by performing the following in real time:
  electronically generating real time data about food consumers in a predetermined location;
  selecting one or more queuing models from a plurality of queuing models;
  inputting relevant portions of the electronically generated real time data about said food consumers into the respective one or more queuing models selected; and
  simulating each of said one or more queuing models after inputting said relevant portions of said real time data thereinto.

12. The method of claim 10, wherein the predicted amount of prepared food product to be ordered is predicted empirically.

13. The method of claim 7, wherein said electronically generated real time data is generated by a computer configured to acquire and process image data generated by each electronic sensor in response to acquiring the one or more images of the prepared food product in inventory and the food product being prepared.

14. The method of claim 13, wherein at least one sensor is either a color camera or an infrared camera.

15. A real time food production management system comprising:
  means for electronically generating real time data about an amount of prepared food product in inventory and an amount of food product being prepared based on one or more images acquired by one or more electronic sensors of at least one of the prepared food product in inventory and the food product being prepared; and
  means for electronically determining, at least one of the following based on the real time data about the amount of prepared food product in inventory and the amount of food product being prepared electronically generated by the means for electronically generating based on the one or more images acquired by one or more electronic sensors of the at least one of the prepared food product in inventory and the food product being prepared:
  when to dispose of at least one prepared food product that has been in inventory exceeding a first period of time;
  when to dispose of at least one cooked food component that has been available for incorporation into food product being prepared for more than a second period of time;
  when to commence preparation of at least one prepared food product for inventory; and
  a level of a buffer of at least one of the following that can be incorporated into food product being prepared: (i) a food product component, (ii) a condiment, and (iii) a topping.

16. The system of claim 15, wherein the means for electronically generating real time data includes means for electronically tracking and counting at least one of: one or more food product components that can be incorporated into food product being prepared, one or more food products being prepared and one or more prepared food products in inventory.

17. The system of claim 15, wherein the means for generating real time data includes a computer configured to acquire and process image data generated by the one or more electronic sensors in response to acquiring the one or more images of the at least one of prepared food product in inventory and food product being prepared.

18. The system of claim 15, further including:
  means for estimating a remaining time before at least one buffer is empty;
  means for comparing said remaining time to a predetermined interval of time for restocking said one buffer; and
  means for generating, as a function of said comparison, an indication to restock said one buffer.

19. A food production management system comprising:
  a plurality of buffer manager systems, each configured to electronically generate operational data comprising real time data and data generated from said real time data, wherein said real time data is electronically generated in real time from one or more images of prepared food product in inventory and food product being prepared acquired by one or more electronic sensors positioned about a food outlet, wherein said real time data includes an amount of prepared food product in inventory and an amount of food product being prepared, said generated data including at least one of the following:
  when to dispose of at least one prepared food product that has been in inventory exceeding a first period of time;
  when to dispose of at least one cooked food component that has been available for incorporation into food product being prepared for more than a second period of time;
  when to commence preparation of at least one food product for inventory; and
  a level of a buffer of at least one of the following that can be incorporated into food product being prepared: (i) a food product component, (ii) a condiment, and (iii) a topping; and
  a central computer communicatively coupled to each buffer manager system via a communication medium, said central computer operative to receive and aggregate operational data from each buffer manager system and to analyze said operational data for trends across said buffer manager systems related to at least one of the following: food quality, time of service and/or revenue generating capacity.

* * * * *

UNITED STATES PATENT AND TRADEMARK OFFICE
CERTIFICATE OF CORRECTION

| | | |
|---|---|---|
| PATENT NO. | : 8,209,219 B2 | Page 1 of 1 |
| APPLICATION NO. | : 11/402552 | |
| DATED | : June 26, 2012 | |
| INVENTOR(S) | : Kerien W. Fitzpatrick et al. | |

It is certified that error appears in the above-identified patent and that said Letters Patent is hereby corrected as shown below:

Column 51, Line 18, Claim 3, "serve and" should read -- serve, and --

Signed and Sealed this
Twenty-third Day of October, 2012

David J. Kappos
*Director of the United States Patent and Trademark Office*